United States Patent
Uda et al.

(10) Patent No.: US 8,711,998 B2
(45) Date of Patent: Apr. 29, 2014

(54) COOLING STRUCTURE AND COOLING METHOD FOR CONTROL ROD DRIVE MECHANISM AND NUCLEAR REACTOR

(75) Inventors: Nobuki Uda, Hyogo (JP); Chikara Kurimura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 779 days.

(21) Appl. No.: 12/866,983

(22) PCT Filed: Feb. 20, 2009

(86) PCT No.: PCT/JP2009/053053
§ 371 (c)(1),
(2), (4) Date: Aug. 10, 2010

(87) PCT Pub. No.: WO2009/104745
PCT Pub. Date: Aug. 27, 2009

(65) Prior Publication Data
US 2010/0316178 A1 Dec. 16, 2010

(30) Foreign Application Priority Data
Feb. 22, 2008 (JP) .............................. 2008-042042

(51) Int. Cl.
*G21C 7/10* (2006.01)
*G21C 15/253* (2006.01)
*G21C 19/04* (2006.01)
*G21C 7/00* (2006.01)
*G21C 15/00* (2006.01)
*G21C 19/00* (2006.01)

(52) U.S. Cl.
USPC ........... 376/243; 376/207; 376/277; 376/298; 376/327; 376/331; 376/347; 376/361

(58) Field of Classification Search
USPC ......... 376/207, 243, 260, 261, 262, 263, 277, 376/287, 289, 290, 293, 298, 299, 327, 331, 376/347, 361
See application file for complete search history.

(56) References Cited

U.S. PATENT DOCUMENTS 4,708,843 A   11/1987   Desfontaines et al.
5,169,596 A * 12/1992   Orr .............................. 376/293
(Continued)

FOREIGN PATENT DOCUMENTS

CN   101009147 A   8/2007
EP   0 154 113 A2   9/1985
(Continued)

OTHER PUBLICATIONS

Korean Office Action dated Dec. 23, 2011, issued in corresponding Korean Patent Application No. 10-2010-7018468, (South Korea).
(Continued)

*Primary Examiner* — Bernarr Gregory
(74) *Attorney, Agent, or Firm* — Westerman, Hattori, Daniels & Adrian, LLP

(57) ABSTRACT

In a cooling structure and a cooling method for a control rod drive mechanism and in a nuclear reactor, a housing (59) in which magnetic jacks are housed is fixed to an upper portion of a reactor vessel (41), and an air intake unit (102) that takes cooling air into the housing (59), a first exhaust duct (104) that is arranged side by side with the air intake unit (102) in a circumferential direction of the housing (59), into which cooling air in the housing (59) is suctioned through a first inlet (109) at a lower portion thereof, and that guides the cooling air upward, a second exhaust duct (105) that is disposed below the air intake unit (102), into which cooling air in the housing (59) is suctioned through a second inlet (110), and that guides the cooling air to the first exhaust duct (104), and a discharging unit (111) that is formed at an upper portion of the housing (59) and discharges cooling air in the first exhaust duct (104) to the exterior are provided.

11 Claims, 10 Drawing Sheets

(56) References Cited

U.S. PATENT DOCUMENTS

| | | | |
|---|---|---|---|
| 5,339,340 A * | 8/1994 | Hunsbedt | 376/299 |
| 5,406,602 A * | 4/1995 | Hunsbedt et al. | 376/299 |
| 5,499,277 A * | 3/1996 | Hunsbedt | 376/299 |
| 5,742,652 A | 4/1998 | Hankinson et al. | |
| 5,930,321 A * | 7/1999 | Harkness et al. | 376/298 |
| 6,546,066 B2 * | 4/2003 | Baliga et al. | 376/263 |
| 7,158,605 B2 * | 1/2007 | Harkness et al. | 376/263 |
| 2003/0026377 A1 * | 2/2003 | Baliga et al. | 376/261 |
| 2004/0101084 A1 * | 5/2004 | Baliga et al. | 376/261 |

FOREIGN PATENT DOCUMENTS

| | | |
|---|---|---|
| GB | 2 251 974 A | 7/1992 |
| JP | 56-122994 A | 9/1981 |
| JP | 61-182895 U | 11/1986 |
| JP | 2-108998 A | 4/1990 |
| JP | 2-122399 U | 10/1990 |
| JP | 2702993 B2 | 1/1998 |
| JP | 2904410 B2 | 6/1999 |
| KR | 2000-0074957 A | 12/2000 |
| KR | 10-2007-0011172 A | 1/2007 |

OTHER PUBLICATIONS

International Search Report of PCT/JP2009/053053, Mailing Date of Apr. 14, 2009.

Chinese Office Action dated Aug. 10, 2012, issued in corresponding Chinese patent application No. 200980106080.6, w/ English translation, (P.R.C.).

Extended European Search Report dated Jan. 24, 2013, issued in corresponding European Patent Application No. 09713480.3 (7 pages).

European Communication under Rule 71(3)EPC dated Oct. 29, 2013, issued in European Patent Application No. 09 713 480.3 (53 pages).

\* cited by examiner

COOLING STRUCTURE AND COOLING METHOD FOR CONTROL ROD DRIVE MECHANISM AND NUCLEAR REACTOR

The present invention relates to a cooling structure and a cooling method for a control rod drive mechanism placed at an upper portion of a reactor vessel and by which control rods are inserted into and withdrawn from a reactor core, and also relates to a nuclear reactor that includes the control rod drive mechanism.

BACKGROUND OF THE INVENTION

In pressurized water reactors (PWRs), light water is used as the reactor coolant and neutron moderator. Electricity is produced by converting the light water into high-temperature and high-pressure water that does not boil throughout the primary system, generating steam by sending the high-temperature and high-pressure water to a steam generator and performing heat exchange, and sending the steam to a turbine generator.

In such a pressurized water reactor, the number of neutrons produced in the reactor core is adjusted by absorbing the neutrons by the use of control rods, whereby the output of the nuclear reactor is controlled. Accordingly, the control rods are dispersed and incorporated in advance in fuel assemblies forming the reactor core, and are collectively controlled. The control rods are inserted into and withdrawn from the reactor core by a control rod drive mechanism (CRDM) placed at the upper portion of the reactor vessel.

In general, a magnetic jack is often used as a control rod drive mechanism of a pressurized water reactor. A drive shaft of the magnetic jack is placed in a guide tube at the center. A stationary gripper magnetic pole, a stationary gripper spring, a stationary latch mechanism, and the like are formed at the lower portion of the guide tube. A stationary gripper coil is arranged near the stationary gripper magnetic pole. A lifting magnetic pole, a movable gripper spring, a movable gripper magnetic pole, a movable latch mechanism, and the like are formed at the upper portion of the guide tube. A lifting coil is arranged near the lifting magnetic pole, and a movable gripper coil is arranged near the movable gripper magnetic pole. Accordingly, the control rods can be driven vertically.

In this case, a coil used for the control rod drive mechanism must be cooled constantly because the temperature of the coil is increased when a current passes through the coil. Patent Document 1 discloses a cooling device for a control rod drive mechanism. In a cooling method for the control rod drive mechanism disclosed in Patent Document 1, ambient air is taken into a shroud along an upper portion of the shroud by a ventilation fan, and the air is discharged to the exterior through an air port at the lower portion of the shroud after cooling the control rod drive mechanism.

[Patent Document 1] Japanese Patent No. 2904410

In the conventional cooling method for the control rod drive mechanism described above, the control rod drive mechanism is cooled by ambient air forcibly directed into the shroud along the upper portion of the shroud with the ventilation fan and then directed to the control rod drive mechanism. The air that has cooled the control rod drive mechanism is further directed downward and is pushed out to the exterior through the air port at the lower portion of the shroud. In this case, with the cooling air flowing from above to below, it is difficult to discharge the air whose temperature has risen by cooling the control rod drive mechanism by further directing the air downward. Accordingly, the cooling air does not circulate efficiently in the shroud, resulting in reduced cooling efficiency of the control rod drive mechanism.

The present invention has been made to solve the problems described above, and an object of the present invention is to provide a cooling structure and a cooling method for a control rod drive mechanism and a nuclear reactor capable of improving the cooling efficiency of the control rod drive mechanism.

BRIEF SUMMARY OF THE INVENTION

According to an aspect of the present invention, a cooling structure for a control rod drive mechanism that is placed at an upper portion of a reactor vessel and by which a control rod is inserted into and withdrawn from a reactor core by using a magnetic jack, includes: a housing that is fixed to the upper portion of the reactor vessel and in which the magnetic jack is housed; an air intake unit that takes cooling air into the housing; a first exhaust duct that is arranged side by side with the air intake unit in a circumferential direction of the housing, into which cooling air in the housing is suctioned through a first inlet at a lower portion thereof, and that guides the cooling air upward; a second exhaust duct that is disposed below the air intake unit, into which cooling air in the housing is suctioned through a second inlet, and that guides the cooling air to the first exhaust duct; and a discharging unit that is attached to an upper portion of the housing and discharges cooling air in the first exhaust duct to exterior.

Advantageously, in the cooling structure for the control rod drive mechanism, the housing includes a plurality of vertically disposed structures arranged side by side at predetermined intervals in a circumferential direction, and the second exhaust duct is communicatively connected to the first exhaust duct by penetrating through the structures.

Advantageously, in the cooling structure for the control rod drive mechanism, each of the structures is formed in a hollow shape, has a third inlet through which cooling air in the housing is suctioned, and is communicatively connected to the second exhaust duct through a thorough hole.

Advantageously, in the cooling structure for the control rod drive mechanism, the second exhaust duct includes a projecting unit projecting inside the housing and the second inlet is formed on the projecting unit.

Advantageously, in the cooling structure for the control rod drive mechanism, the first inlet is provided with a flow rate adjusting member for adjusting an amount of cooling air flow.

Advantageously, in the cooling structure for the control rod drive mechanism, the second exhaust duct includes a flow rate adjusting member for adjusting an amount of cooling air flow.

Advantageously, in the cooling structure for the control rod drive mechanism, the housing has an openable and closable operation opening formed below the air intake unit, and the second inlet is formed below the operation opening.

Advantageously, in the cooling structure for the control rod drive mechanism, the discharging unit includes an exhaust fan.

According to another aspect of the present invention, a cooling method for a control rod drive mechanism that is placed at an upper portion of a reactor vessel and by which a control rod is inserted into and withdrawn from a reactor core by using a magnetic jack, includes: taking cooling air into inside of a housing in which the magnetic jack is housed along an upper side wall of the housing; extracting cooling air in the housing to an exhaust duct along an entire periphery of a lower side wall of the housing after cooling the magnetic jack while directing the cooling air downward; and discharging the cooling air to exterior by an exhaust fan after directing the cooling air upward through the exhaust duct.

Advantageously, in the cooling method for the control rod drive mechanism, the exhaust duct is arranged side by side with an air intake unit in a circumferential direction of the housing, and cooling air that has cooled the magnetic jack is suctioned in through a first inlet at a lower portion of the exhaust duct, is suctioned in through a second inlet formed below the air intake unit, and is discharged by directing the cooling air upward through the exhaust duct.

According to still another aspect of the present invention, a nuclear reactor includes: a reactor vessel; a core barrel disposed in the reactor vessel; a reactor core disposed in the core barrel; a plurality of control rods that controls the reactor core; a control rod drive mechanism placed at an upper portion of the reactor vessel and by which the control rods are inserted into and withdrawn from the reactor core by using a magnetic jack; and a control rod drive mechanism cooling device that cools the control rod drive mechanism with cooling air. The nuclear reactor produces electricity by generating steam by heat exchange between nuclear fuel and coolant, and driving a power generating turbine with generated steam. The control rod drive mechanism cooling device includes a housing that is fixed to the upper portion of the reactor vessel and in which the magnetic jack is housed, an air intake unit that takes cooling air into the housing, a first exhaust duct that is arranged side by side with the air intake unit in a circumferential direction of the housing, into which cooling air in the housing is suctioned through a first inlet at a lower portion thereof, and that guides the cooling air upward, a second exhaust duct that is disposed below the air intake unit, into which cooling air in the housing is suctioned through a second inlet, and that guides the cooling air to the first exhaust duct, and a discharging unit that is provided to an upper portion of the housing and discharges cooling air in the first exhaust duct to exterior.

In the cooling structure for the control rod drive mechanism of the invention of claim 1, the air intake unit that takes cooling air into the housing and the first exhaust duct into which cooling air in the housing is suctioned through the first inlet at the lower portion thereof and that guides the cooling air upward are arranged side by side in the circumferential direction of the housing. The second exhaust duct into which cooling air in the housing is suctioned through the second inlet and that guides the cooling air to the first exhaust duct is disposed below the air intake unit. Accordingly, the cooling air taken into the housing through the air intake unit is suctioned in through the inlets formed in almost the entire area of the lower portion of the housing in the circumferential direction, and is discharged to the exterior. Accordingly, the cooling air is evenly circulated substantially throughout the inside of the housing, thereby uniformly and efficiently cooling the magnetic jacks. Consequently, it is possible to improve the cooling efficiency of the control rod drive mechanism.

In the cooling structure for the control rod drive mechanism of the invention of claim 2, the housing includes the vertically disposed structures arranged side by side at predetermined intervals in the circumferential direction, and the second exhaust duct is communicatively connected to the first exhaust duct by penetrating through the structures. Accordingly, the second exhaust duct can be arranged without changing the structures. It is also possible to improve the cooling efficiency of the control rod drive mechanism, while preventing a reduction in the strength of the housing.

In the cooling structure for the control rod drive mechanism of the invention of claim 3, each of the structures is formed in a hollow shape, has a third inlet through which cooling air in the housing is suctioned, and is communicatively connected to the second exhaust duct through the through hole. Accordingly, the second exhaust duct can be arranged without changing the structures, and it is also possible to prevent stagnation of cooling air in the housing by forming the inlet. Consequently, it is possible to improve the cooling efficiency of the control rod drive mechanism while preventing a reduction in the strength of the housing.

In the cooling structure for the control rod drive mechanism of the invention of claim 4, the second exhaust duct includes the projecting unit projecting inside the housing, and the second inlet is formed on the projecting unit. By obtaining a sufficient opening area of the second inlet, it is possible to improve the suction performance of cooling air from the housing to the second exhaust duct. Accordingly, it is possible to improve the cooling efficiency of the control rod drive mechanism, while preventing stagnation of cooling air in the housing.

In the cooling structure for the control rod drive mechanism of the invention of claim 5, the first inlet is provided with the flow rate adjusting member for adjusting the amount of cooling air flow. Accordingly, cooling air can be efficiently circulated in the housing by adjusting the amount of cooling air suctioned into the first exhaust duct through the first inlet and the amount of cooling air suctioned into the second exhaust duct through the second inlet.

In the cooling structure for the control rod drive mechanism of the invention of claim 6, the second exhaust duct includes the flow rate adjusting member for adjusting the amount of cooling air flow. Accordingly, cooling air can be efficiently circulated in the housing by adjusting the amount of cooling air suctioned into the first exhaust duct through the first inlet and the amount of cooling air suctioned into the second exhaust duct through the second inlet.

In the cooling structure for the control rod drive mechanism of the invention of claim 7, the housing has the openable and closable operation opening formed below the air intake unit. Because the second inlet is formed below the operation opening, even if the operation opening is formed in addition to the air intake unit, the cooling air in the housing is suctioned in through the inlets formed in almost the entire area of the lower portion of the housing in the circumferential direction and is discharged to the exterior. Accordingly, the cooling air is evenly circulated substantially throughout the inside of the housing.

In the cooling structure for the control rod drive mechanism of the invention of claim 8, the discharging unit includes the exhaust fan. By operating the exhaust fan, negative pressure is applied to the inside of the housing from the first exhaust duct and the second exhaust duct through the inlets, thereby forcibly discharging the cooling air in the housing to the exterior. Accordingly, it is possible to improve the cooling efficiency of the control rod drive mechanism while preventing stagnation of the cooling air in the housing.

In the cooling method for the control rod drive mechanism of the invention of claim 9, cooling air is taken into the inside of the housing in which the magnetic jack is housed along the upper side wall of the housing, the cooling air in the housing is extracted to the exhaust duct along the entire periphery of the lower side wall of the housing after cooling the magnetic jack while directing the cooling air downward, and the cooling air is discharged to the exterior by the exhaust fan after directing the cooling air upward through the exhaust duct. Accordingly, the cooling air is evenly circulated substantially throughout the inside of the housing, thereby uniformly and efficiently cooling the magnetic jacks. It is thus possible to improve the cooling efficiency of the control rod drive mechanism.

In the cooling method for the control rod drive mechanism of the invention of claim 10, the exhaust duct is arranged side by side with the air intake unit in the circumferential direction of the housing, and the cooling air that has cooled the magnetic jack is suctioned in through the first inlet at the lower portion of the exhaust duct, then suctioned in through the second inlet formed below the air intake unit, and finally discharged by directing the cooling air upward through the exhaust duct. Accordingly, it is possible to efficiently discharge the cooling air in the housing.

The nuclear reactor of the invention of claim 11 includes the reactor vessel, the core barrel, the reactor core, the control rods, the control rod drive mechanism, and the control rod drive mechanism cooling device. In the control rod drive mechanism cooling device, the air intake unit that takes cooling air into the housing and the first exhaust duct into which the cooling air in the housing is suctioned through the first inlet at the lower portion of the air intake unit and that guides the cooling air upward are arranged side by side in the circumferential direction of the housing, and the second exhaust duct into which cooling air in the housing is suctioned through the second inlet and that guides the cooling air to the first exhaust duct is disposed below the air intake unit. Accordingly, the cooling air taken into the housing through the air intake unit is suctioned through the inlets formed in almost the entire area of the lower portion of the housing in the circumferential direction and is discharged to the exterior. Consequently, the cooling air is evenly circulated substantially throughout the inside of the housing, thereby uniformly and efficiently cooling the magnetic jacks. It is thus possible to improve the cooling efficiency of the control rod drive mechanism, and as a result, it is possible to control the output of the nuclear reactor with a high level of accuracy.

Figure 1:
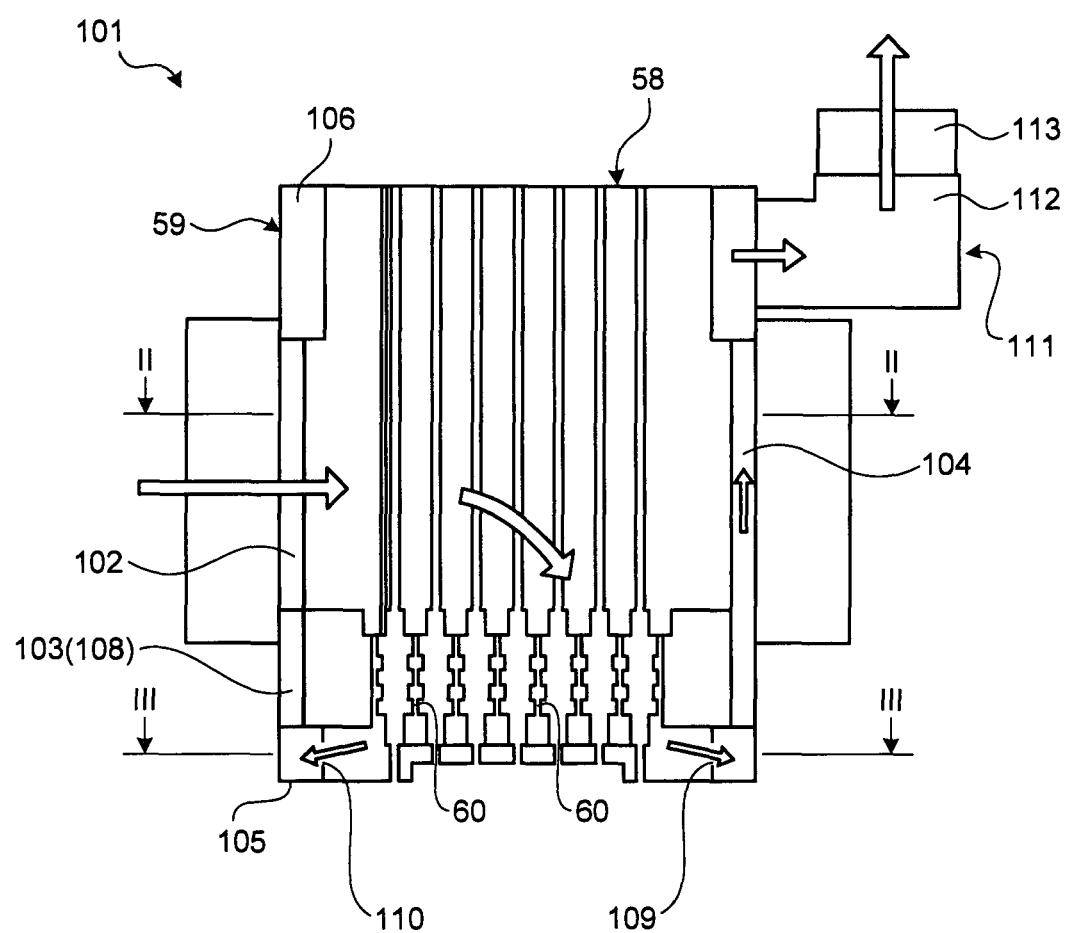
FIG. 1 is a sectional view of a control rod drive mechanism cooling device, illustrating a cooling structure for a control rod drive mechanism according to a first embodiment of the present invention.

EXPLANATIONS OF LETTERS OR NUMERALS 12 pressurized water reactor
41 reactor vessel
46 core barrel
53 reactor core
54 fuel assembly
55 control rod
57 control rod cluster guide tube
58 control rod drive mechanism
59 housing
60 control rod cluster drive shaft
101 control rod drive mechanism cooling device
102 air intake unit
103 operation opening
104 first exhaust duct
105, 105a, 105b, 121a, 121b, 132a, 132b second exhaust duct
106 third exhaust duct
107 ceiling
109 first inlet
110, 110a, 110b, 123a, 123b, 133a, 133b second inlet
111 discharging unit
112 connected exhaust duct
113 exhaust fan
114, 131 column (structure)
114a through hole
122a, 122b projecting unit
134 third inlet
141, 151 porous plate (flow rate adjusting member)

DETAILED DESCRIPTION OF THE INVENTION

Exemplary embodiments of a cooling structure for a control rod drive mechanism and a nuclear reactor according to the present invention will be described below in greater detail with reference to the accompanying drawings. However, the present invention is not limited to the embodiments.

Figure 2:
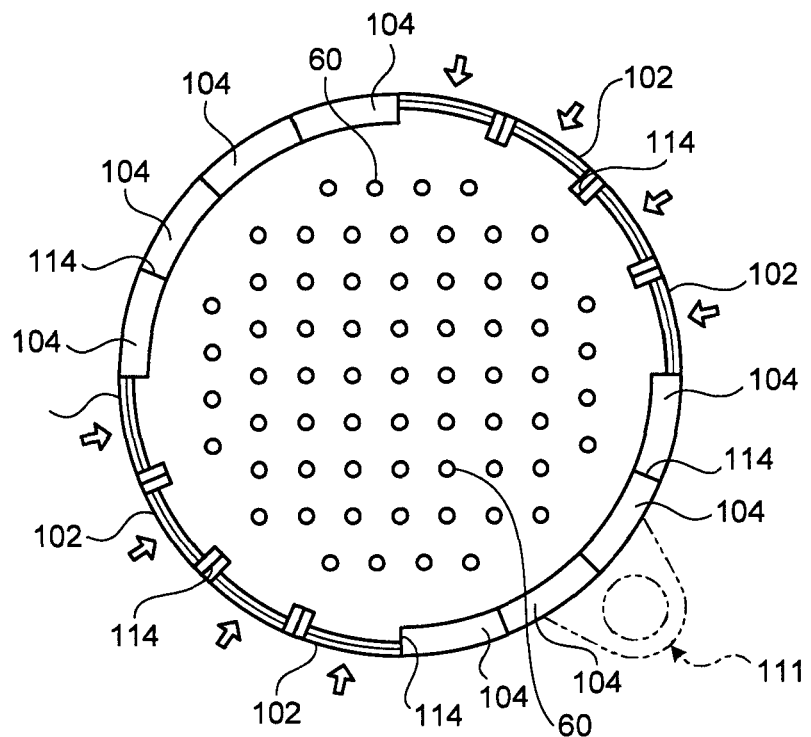
FIG. 2 is a sectional view taken along the line II-II in FIG. 1.
Figure 3:
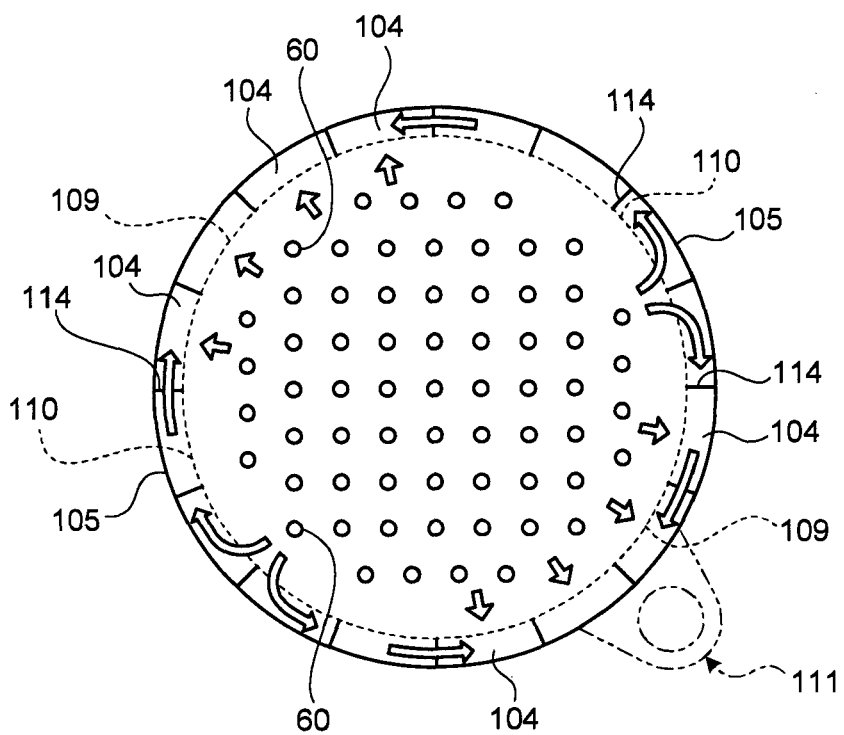
FIG. 3 is a sectional view taken along the line III-III in FIG. 1.
Figure 4:
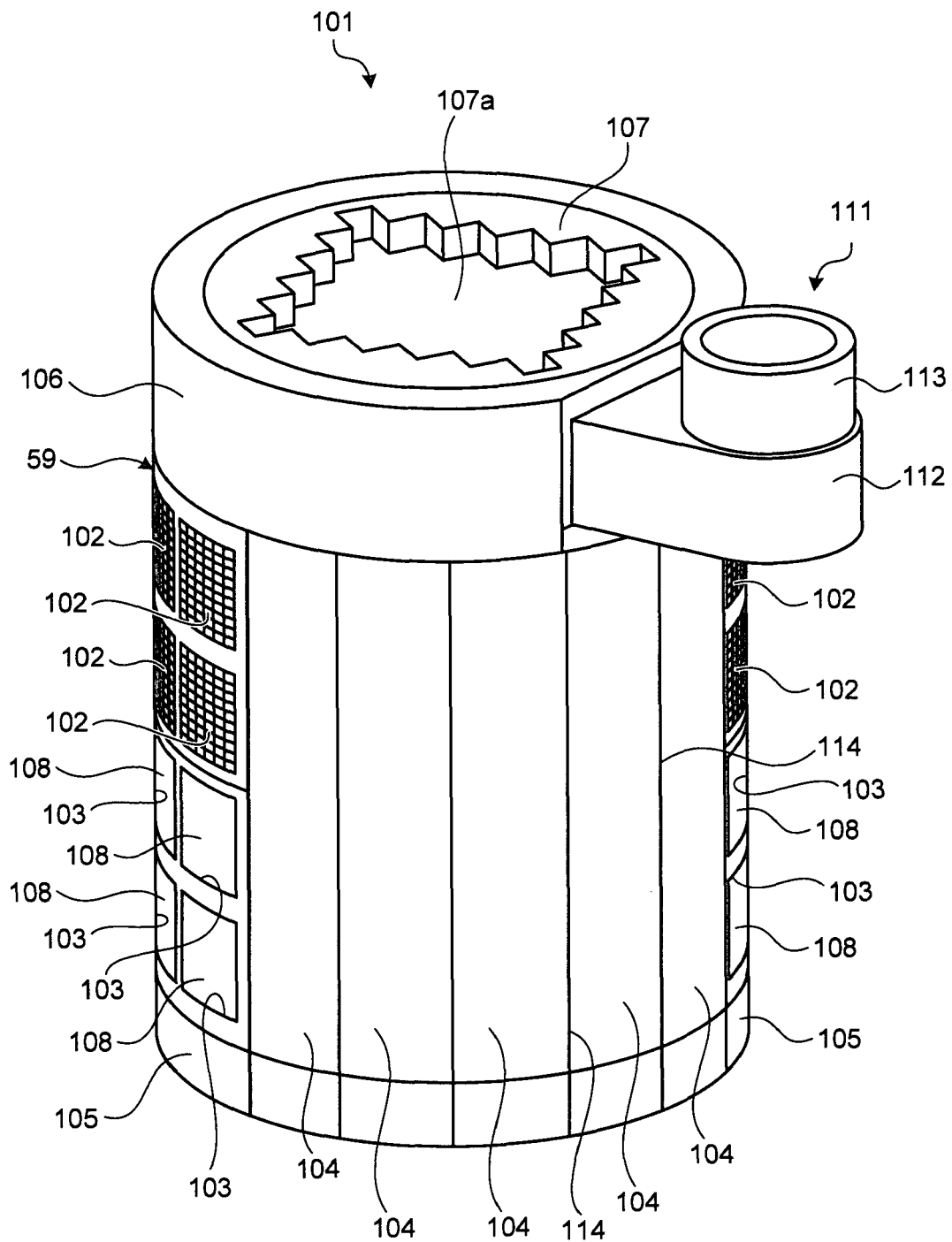
FIG. 4 is a perspective schematic view of the control rod drive mechanism cooling device of the first embodiment.
Figure 5:
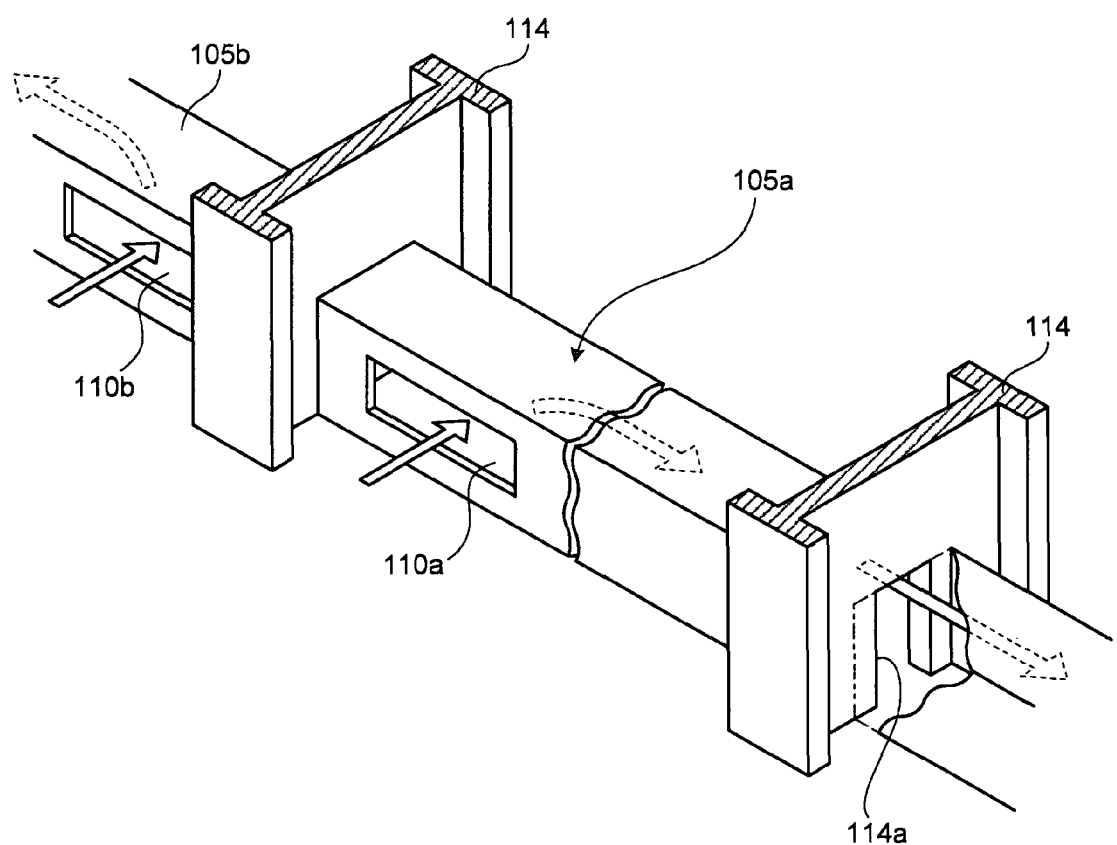
FIG. 5 is a schematic of second exhaust ducts in the control rod drive mechanism cooling device of the first embodiment.
Figure 6:
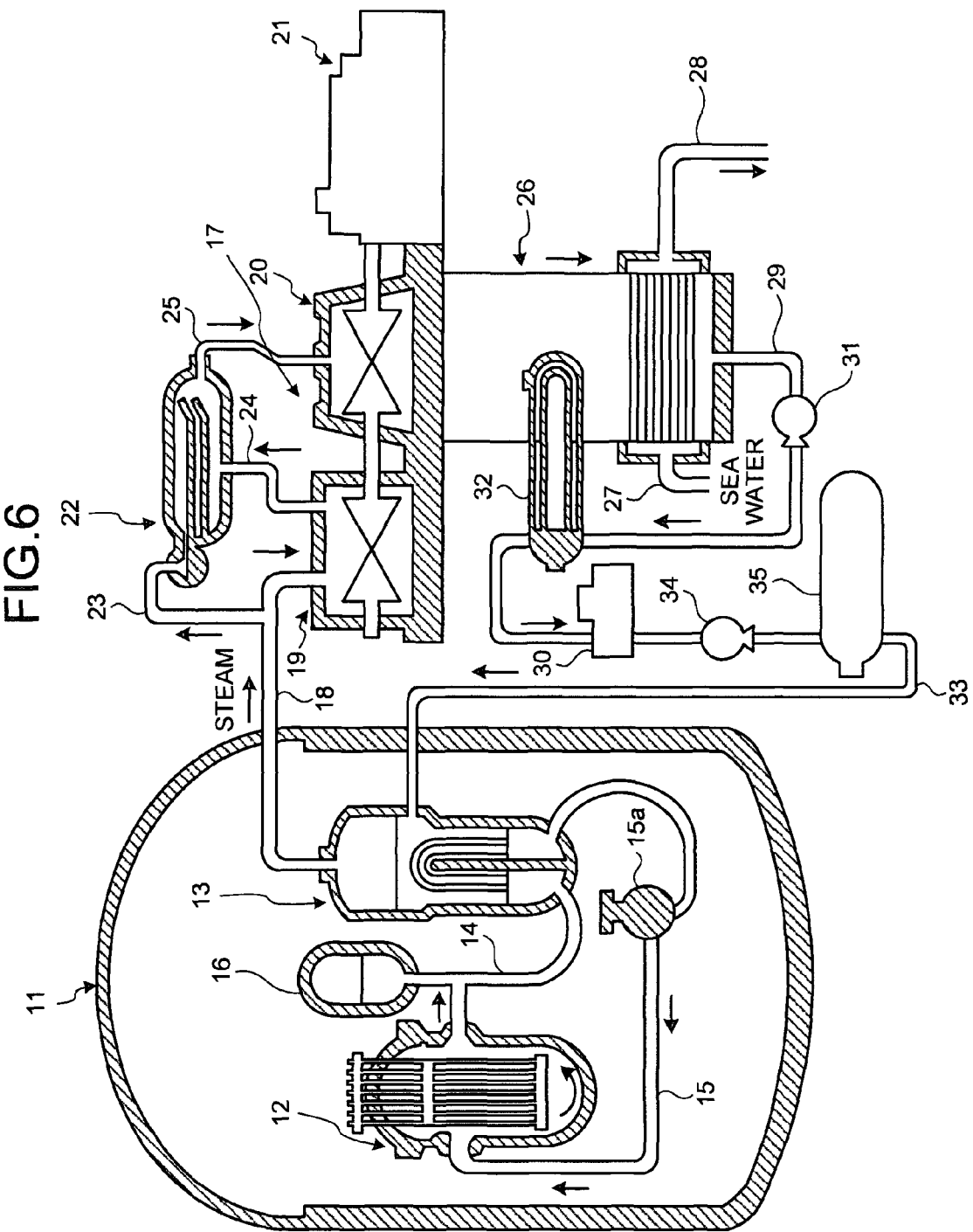
FIG. 6 is a schematic configuration diagram of a nuclear power plant including a pressurized water reactor of the first embodiment.
Figure 7:
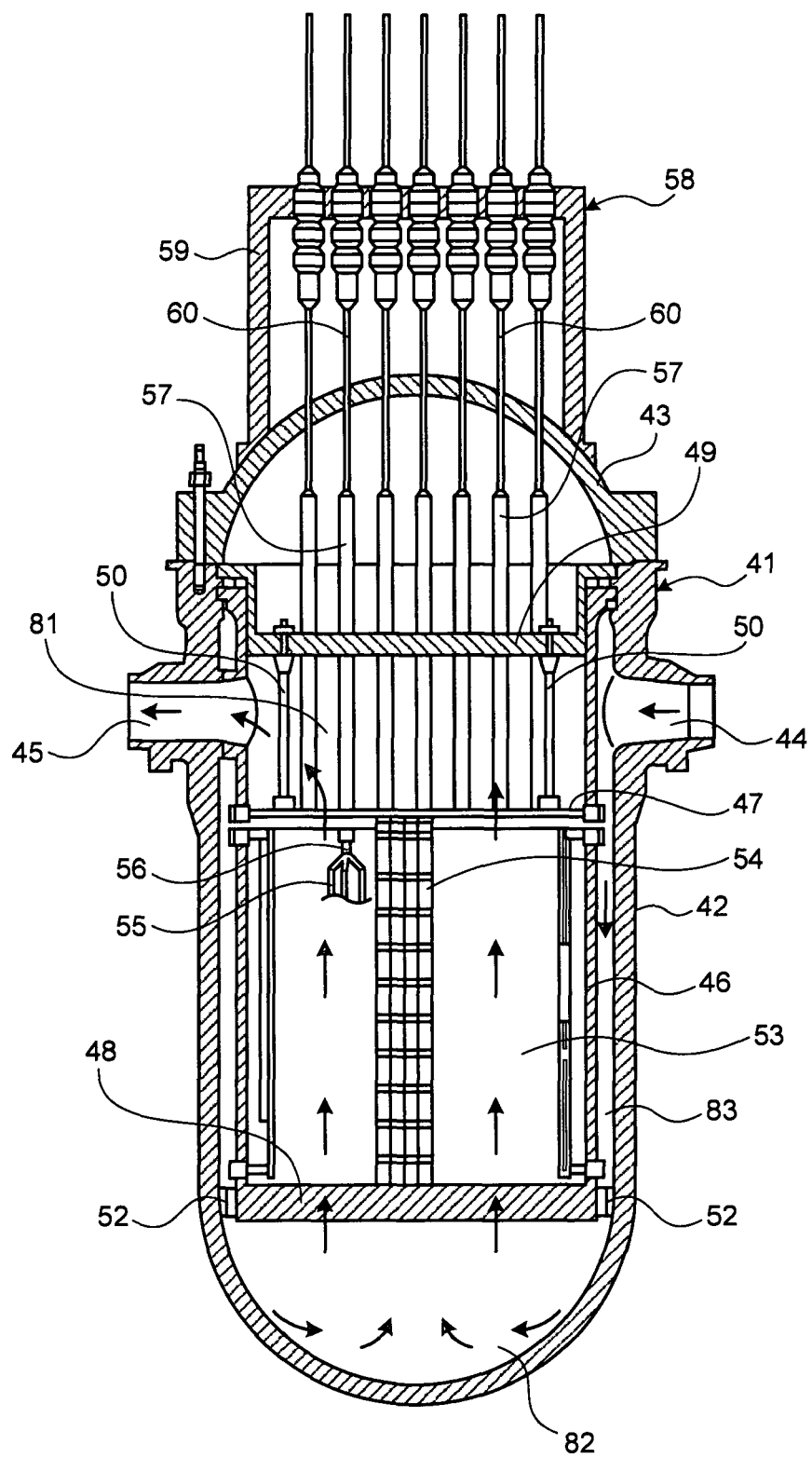
FIG. 7 is a longitudinal sectional view of the pressurized water reactor of the first embodiment.
Figure 8:
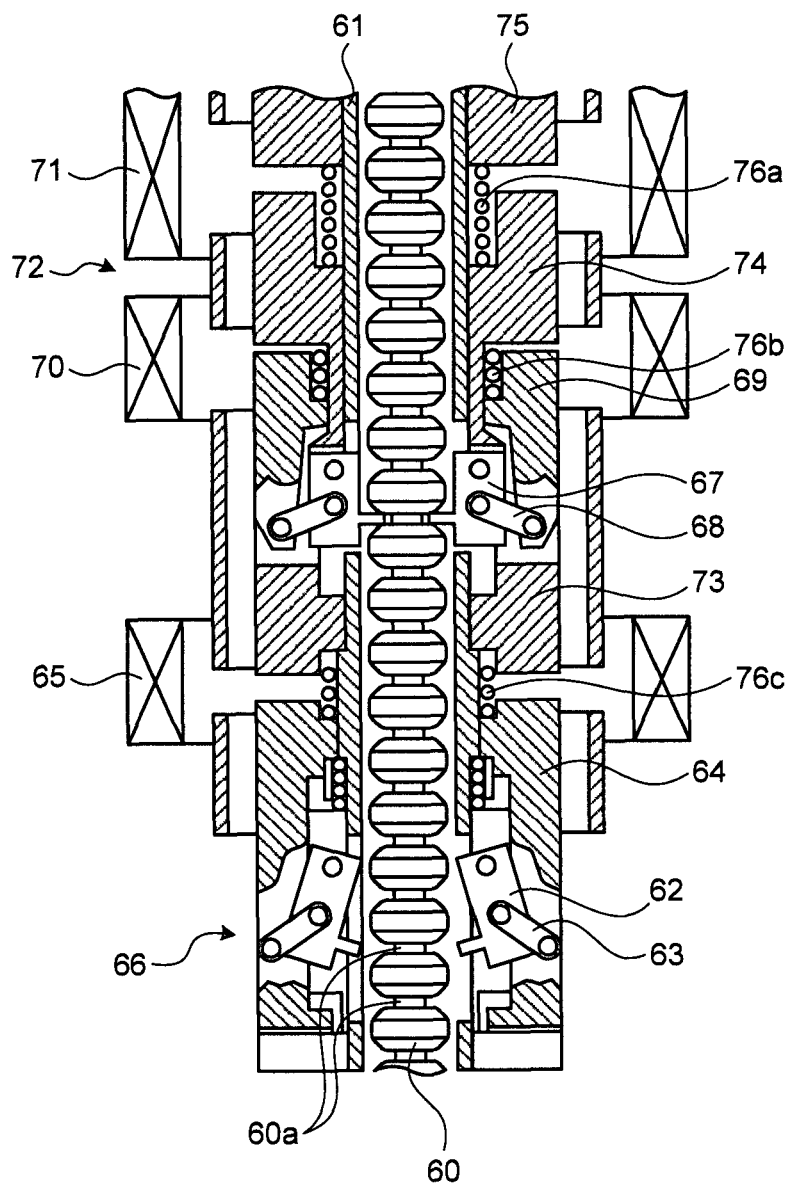
FIG. 8 is a sectional view of an essential portion of the control rod drive mechanism in the pressurized water reactor of the first embodiment.

FIG. 1 is a sectional view of a control rod drive mechanism cooling device, illustrating a cooling structure for a control rod drive mechanism according to a first embodiment of the present invention. FIG. 2 is a sectional view taken along the line II-II in FIG. 1. FIG. 3 is a sectional view taken along the line III-III in FIG. 1. FIG. 4 is a perspective schematic view of the control rod drive mechanism cooling device of the first embodiment. FIG. 5 is a schematic of second exhaust ducts in the control rod drive mechanism cooling device of the first embodiment. FIG. 6 is a schematic configuration diagram of a nuclear power plant including a pressurized water reactor of the first embodiment. FIG. 7 is a longitudinal sectional view of the pressurized water reactor of the first embodiment. FIG. 8 is a sectional view of an essential portion of the control rod drive mechanism in the pressurized water reactor of the first embodiment.

A nuclear reactor of the first embodiment is a pressurized water reactor (PWR) in which light water is used as the reactor coolant and neutron moderator. The nuclear reactor produces electricity by converting the light water into high-temperature and high-pressure water that does not boil throughout the reactor core, generating steam by sending the high-temperature and high-pressure water to a steam generator and performing heat exchange, and sending the steam to a turbine generator.

In a nuclear reactor power plant including the pressurized water reactor of the present embodiment, as illustrated in FIG. 6, a reactor containment vessel 11 contains a pressurized water reactor 12 and a steam generator 13. The pressurized water reactor 12 is connected to the steam generator 13 through cooling water pipes (coolant supply pipe system) 14 and 15. The cooling water pipe 14 is provided with a pressurizer 16, and the cooling water pipe 15 is provided with a cooling water pump 15a. In this case, light water is used as moderator and primary cooling water, and to prevent the primary cooling water from boiling in a reactor core unit, the primary cooling system is controlled so that a high-pressure state of about 150 to 160 atmospheric pressure is maintained by the pressurizer 16. Accordingly, in the pressurized water reactor 12, light water as primary cooling water is heated by low-enriched uranium or mixed oxide (MOX) as fuel (nuclear fuel), and the high-temperature primary cooling water is sent to the steam generator 13 through the cooling water pipe 14 in a predetermined high-pressure state maintained by the pressurizer 16. In the steam generator 13, heat exchange is carried out between the high-pressure/high-temperature primary cooling water and secondary cooling water, and the cooled primary cooling water is returned to the pressurized water reactor 12 through the cooling water pipe 15.

The steam generator 13 is connected to a steam turbine 17 through a cooling water pipe 18. The steam turbine 17 includes a high-pressure turbine 19 and a low-pressure turbine 20, and is connected to a generator 21. A moisture separation heater 22 is placed between the high-pressure turbine 19 and the low-pressure turbine 20, and a cooling water branch pipe 23 branched from the cooling water pipe 18 is connected to the moisture separation heater 22. The high-pressure turbine 19 is connected to the moisture separation heater 22 through a low-temperature reheating pipe 24, and the moisture separation heater 22 is connected to the low-pressure turbine 20 through a high-temperature reheating pipe 25. The low-pressure turbine 20 of the steam turbine 17 includes a condenser 26, and an intake pipe 27 and a drain pipe 28 for supplying and draining cooling water (such as sea water) are connected to the condenser 26. The condenser 26 is connected to a deaerator 30 through a cooling water pipe 29, and the cooling water pipe 29 is provided with a condensate pump 31 and a low-pressure feed water heater 32. The deaerator 30 is connected to the steam generator 13 through a cooling water pipe 33, and the cooling water pipe 33 is provided with a feed water pump 34 and a high-pressure feed water heater 35.

Accordingly, in the steam generator 13, steam generated by heat exchange with high-pressure/high-temperature primary cooling water is sent to the steam turbine 17 (from the high-pressure turbine 19 to the low-pressure turbine 20) through the cooling water pipe 18. Electricity is produced by the generator 21 by driving the steam turbine 17 with the steam. At this time, moisture contained in the steam from the steam generator 13 that has driven the high-pressure turbine 19 is reduced by the moisture separation heater 22. The steam is then heated and drives the low-pressure turbine 20. The steam that has driven the steam turbine 17 is cooled by the condenser 26 and is condensed into condensate. The condensate is then heated, for example, with low-pressure steam bled from the low-pressure turbine 20 by the low-pressure feed water heater 32. After impurities such as dissolved oxygen and non-condensable gas (ammonia gas) are reduced by the deaerator 30, the condensate is heated, for example, with high-pressure steam bled from the high-pressure turbine 19 by the high-pressure feed water heater 35 and thereafter returned to the steam generator 13.

In the pressurized water reactor 12, as illustrated in FIG. 7, a reactor vessel 41 includes a reactor vessel main body 42 and a reactor vessel lid 43 mounted on the top of the reactor vessel main body 42, so that core internals can be inserted into the reactor vessel 41. The reactor vessel lid 43 is openable and closable relative to the reactor vessel main body 42. The reactor vessel main body 42 is formed in a cylinder shape upper portion of which is opened and lower portion of which is spherically closed. An inlet nozzle 44 and an outlet nozzle 45 for supplying and draining light water (coolant) as primary cooling water are formed at the upper portion of the reactor vessel main body 42.

In the reactor vessel main body 42, a core barrel 46 formed in a cylinder shape is disposed below the inlet nozzle 44 and the outlet nozzle 45, with a predetermined gap from the inner surface of the reactor vessel main body 42. An upper core plate 47 in a disk shape and through which a large number of communicating holes (not illustrated) are formed, is connected to the upper portion of the core barrel 46. Similarly, a lower core plate 48 in a disk shape and through which a large number of communicating holes (not illustrated) are formed, is connected to the lower portion of the core barrel 46. An upper core support plate 49 in a disk shape and placed above the core barrel 46 is fixed in the reactor vessel main body 42. The upper core plate 47, in other words, the core barrel 46, is suspended from and supported by the upper core support plate 49 through a plurality of core support rods 50. The lower core plate 48, in other words, the core barrel 46, is positioned and held relative to the inner surface of the reactor vessel main body 42 by a plurality of radial keys 52.

The core barrel 46, the upper core plate 47, and the lower core plate 48 make up a reactor core 53, and a large number of fuel assemblies 54 are arranged in the reactor core 53. Although not illustrated, the fuel assemblies 54 include a large number of fuel rods bundled in grid pattern by a support grid. An upper nozzle is fixed to the upper end of each of the fuel assemblies 54, and a lower nozzle is fixed to the lower end of the fuel assembly 54. The upper ends of a plurality of control rods 55 are gathered and formed into a control rod cluster 56, so as to be inserted into the fuel assembly 54. A large number of control rod cluster guide tubes 57 that have penetrated through the upper core support plate 49 are supported by the upper core support plate 49, and the lower ends of the control rod cluster guide tubes 57 are extended to the control rod cluster 56 of the fuel assemblies 54.

A magnetic jack type control rod drive mechanism 58 is mounted on the top of the reactor vessel lid 43 included in the reactor vessel 41, and is housed in a housing 59 integrally formed with the reactor vessel lid 43. The upper ends of a large number of control rod cluster guide tubes 57 are extended to the control rod drive mechanism 58. Control rod cluster drive shafts 60 extended from the control rod drive mechanism 58 are extended to the fuel assemblies 54 through the control rod cluster guide tubes 57, thereby holding the control rod cluster 56. Although not illustrated, a large number of in-core instrumentation guide tubes that have penetrated through the upper core support plate 49 are supported by the upper core support plate 49, and the lower ends of the in-core instrumentation guide tubes are extended to the fuel assemblies 54, thereby allowing a sensor for measuring neutron flux to be inserted therethrough.

The control rod drive mechanism 58 controls the output of the nuclear reactor by extending in the vertical direction to be connected to the control rod cluster 56, and vertically moving the control rod cluster drive shaft (hereinafter, "drive shaft") 60 surface on which a plurality of circumferential grooves is formed at equal pitch in the longitudinal direction, using the magnetic jacks.

In other words, as illustrated in FIG. 8, a plurality of circumferential grooves 60a is formed on the surface of the drive shaft 60 in the longitudinal direction, and the drive shaft 60 is allowed to move in the axial direction in a drive shaft housing 61 formed in a cylinder shape. A holding mechanism 66 includes a stationary gripper latch 62 capable of engaging with and disengaging from one of the circumferential grooves 60a of the drive shaft 60, and a stationary gripper coil 65 for driving the stationary gripper latch 62 with a latch link 63 and a plunger 64. The holding mechanism 66 vertically holds the drive shaft 60 with the stationary gripper latch 62 engaging with the circumferential groove 60a. A drive mechanism 72 includes a movable gripper latch 67 capable of engaging with and disengaging from one of the circumferential grooves 60a of the drive shaft 60, a movable gripper coil 70 that drives the movable gripper latch 67 with a latch link 68 and a plunger 69, and a pick-up coil 71 that vertically moves the latch link 68 and the plunger 69. The drive mechanism 72 vertically moves the drive shaft 60.

A stationary gripper magnetic pole 73 is excited by the stationary gripper coil 65, a movable gripper magnetic pole 74 is excited by the movable gripper coil 70, and a pick-up magnetic pole 75 is excited by the pick-up coil 71. Return springs 76a to 76c are also provided.

For example, in a state in which the stationary gripper magnetic pole 73 is demagnetized by the stationary gripper coil 65 so that the stationary gripper latch 62 is separated from the circumferential groove 60a of the drive shaft 60, and the movable gripper magnetic pole 74 is excited by the movable gripper coil 70 so that the movable gripper latch 67 is engaged with the circumferential groove 60a of the drive shaft 60, if the pick-up magnetic pole 75 is excited by the pick-up coil 71, the movable gripper magnetic pole 74 and the movable gripper latch 67 are suctioned to the side of the pick-up magnetic pole 75 with the movable gripper coil 70, against the biasing force of the return spring 76a. Accordingly, the drive shaft 60 is moved upward by one pitch.

After the stationary gripper magnetic pole 73 is excited by the stationary gripper coil 65 so that the stationary gripper latch 62 is engaged with the circumferential groove 60a of the drive shaft 60, if the movable gripper magnetic pole 74 is demagnetized by the movable gripper coil 70 and the pick-up magnetic pole 75 is demagnetized by the pick-up coil 71, the movable gripper latch 67 is separated from the circumferential groove 60a of the drive shaft 60. Accordingly, the movable gripper magnetic pole 74 and the movable gripper latch 67 can move downward with the movable gripper coil 70 by the biasing force of the return spring 76a.

After the movable gripper magnetic pole 74 is excited by the movable gripper coil 70 so that the movable gripper latch 67 is engaged with the circumferential groove 60a of the drive shaft 60, the drive shaft 60 can move upward to a predetermined pitch by repeating the operation described above from the state in which the stationary gripper magnetic pole 73 is demagnetized by the stationary gripper coil 65 and the stationary gripper latch 62 is separated from the circumferential groove 60a of the drive shaft 60. The drive shaft 60 can move downward simply by performing the reverse operation from that described above.

Accordingly, referring back to FIG. 7, nuclear fission in the reactor core 53 is controlled by moving the control rod cluster drive shaft 60 using the control rod drive mechanism 58 and by inserting the control rods 55 into the fuel assemblies 54. Light water filled in the reactor vessel 41 is heated by the generated thermal energy, and the high-temperature light water is discharged through the outlet nozzle 45, sent to the steam generator 13 as described above. In other words, neutrons are emitted when uranium or plutonium as fuel for forming the fuel assemblies 54 undergoes fission, and the kinetic energy of the emitted fast neutrons is reduced by light water as moderator and primary cooling water, whereby the fast neutrons are converted into thermal neutrons. Accordingly, new fissions are likely to occur, and the light water is deprived of heat being generated and is cooled. The number of neutrons produced in the reactor core 53 is adjusted by inserting the control rods 55 into the fuel assemblies 54, and the control rods 55 are quickly inserted into the fuel assemblies 54 to immediately stop a nuclear reactor.

In the reactor vessel 41, an upper plenum 81 that is communicatively connected to the outlet nozzle 45 is formed above the reactor core 53, and a lower plenum 82 is formed below the reactor core 53. A downcomer unit 83 communicatively connected to the inlet nozzle 44 and the lower plenum 82 is formed between the reactor vessel 41 and the core barrel 46. Accordingly, light water flows into the reactor vessel main body 42 through four inlet nozzles 44, flows down the downcomer unit 83, and reaches the lower plenum 82. The light water then flows upward by being guided by the inner spherical surface of the lower plenum 82, passes through the lower core plate 48, and flows into the reactor core 53. The light water that has flowed into the reactor core 53 cools the fuel assemblies 54 by absorbing thermal energy generated by the fuel assemblies 54 forming the reactor core 53. The high-temperature light water then passes through the upper core plate 47, flows upward to the upper plenum 81, and is discharged through the outlet nozzle 45.

In the pressurized water reactor 12 formed in this manner, in the present embodiment, a cooling device that cools the control rod drive mechanism 58 is provided. As illustrated in FIGS. 1 to 4, in a control rod drive mechanism cooling device 101, a side wall of the housing 59 is formed by connecting an air intake unit 102, an operation opening 103, a first exhaust duct 104, a second exhaust duct 105, and a third exhaust duct 106, and an upper portion of the housing 59 is connected with a ceiling 107. A plurality of magnetic jacks that forms the control rod drive mechanism 58 is housed in the housing 59. In this case, the cooling device of the present embodiment is a suction-exhaust system in which cooling air is suctioned into the housing 59 from the exterior and is discharged by operating an exhaust fan 113 of a discharging unit 111, which will be described later, formed on the housing 59.

In other words, the third exhaust duct 106 placed at the upper portion of the housing 59 is formed in a hollow ring shape. The air intake unit 102 is an opening though which cooling air is taken in from the exterior, and a filter is attached to each opening. The operation opening 103 is an opening through which an operator enters the housing 59 to carry out inspection, maintenance, and the like. The operation opening 103 is closed by an open/close door 108 when the operation opening 103 is not being used, and the open/close door 108 is opened when the operation opening 103 is used. The air intake unit 102 and the operation opening 103 are vertically disposed, so that the operation opening 103 is placed below the air intake unit 102. Two sets of air intake units 102 and operation openings 103 facing the radial direction of the housing 59 are provided at equal intervals in the circumferential direction.

A plurality of first exhaust ducts 104 is disposed in the vertical direction of the housing 59, and is arranged side by side in the circumferential direction. Cooling air in the housing 59 is suctioned into the first exhaust ducts 104 through a first inlet 109 at the lower portion thereof, and the first exhaust ducts 104 guide the cooling air upward. The first exhaust ducts 104 are arranged between the two sets of the air intake units 102 and the operation openings 103 in the circumferential direction of the housing 59. In other words, the air intake units 102, the operation openings 103, and the first exhaust ducts 104 are arranged side by side in the circumferential direction of the housing 59.

The second exhaust duct 105 is disposed below the air intake unit 102 and the operation opening 103. Cooling air in the housing 59 is suctioned into the second exhaust duct 105, and the second exhaust duct 105 guides the cooling air to the first exhaust ducts 104. The second exhaust duct 105 is disposed in the circumferential direction of the housing 59. In this case, in practice, the first exhaust ducts 104 and the second exhaust duct 105 are integrally formed by disposing a duct member formed in a hollow ring shape and the inner periphery of which has a large number of inlets, at the lower end of the housing 59 by connecting the lower ends of the first exhaust ducts 104 with the upper surface of the duct member, and by communicatively connecting the interiors. In other words, the duct member forms a part of the first exhaust ducts 104 and the second exhaust duct 105.

The discharging unit 111 used to discharge cooling air in the first exhaust ducts 104 to the exterior is formed at the upper portion of the housing 59. In other words, a connected exhaust duct 112 is connected to the outer periphery of the third exhaust duct 106, and the exhaust fan 113 is attached to the connected exhaust duct 112. A fitting hole 107a to which one of the magnetic jacks of the control rod drive mechanism 58 is mounted is formed on the ceiling 107 of the housing 59.

The housing 59 includes a plurality of vertically disposed columns 114 arranged side by side at equal intervals in the circumferential direction. The columns 114 act as structures, and in the present embodiment, each of the columns is made of steel whose cross-section is in an H-shape. In other words, a predetermined strength is obtained because the air intake unit 102, the operation opening 103, the first exhaust ducts 104, the second exhaust duct 105, the third exhaust duct 106, and the like are supported by the columns 114. The second exhaust duct 105 is communicatively connected to the first exhaust ducts 104 by penetrating through the columns 114

As illustrated in FIG. 5, the second exhaust ducts 115 (105a and 105b) are circumferentially disposed at both sides of one of the columns 114 placed at an intermediate position in the circumferential direction of the air intake unit 102. Second inlets 110a and 110b opening inside the housing 59 are formed at the base portions of the second exhaust ducts 105a and 105b, and the leading edges are extended to the first exhaust ducts 104 through the columns 114. In this case, in practice, a through hole 114a having a width smaller than the flow passage areas of the second exhaust ducts 105a and 105b is formed at each of the columns 114 located midway between the second exhaust ducts 105a and 105b.

In the control rod drive mechanism cooling device 101 formed in this manner, as illustrated in FIGS. 1 to 3, if the exhaust fan 113 of the discharging unit 111 is operated, the suction force is applied to the inside of the housing 59 from the third exhaust duct 106 through the first inlet 109 of the first exhaust ducts 104. The suction force is also applied to the inside of the housing 59 from the third exhaust duct 106 through the second inlet 110 of the second exhaust duct 105 via the first exhaust ducts 104. The suction force applied to the inside of the housing 59 is also applied to the two air intake units 102.

Accordingly, ambient air is taken into the housing 59 through the air intake units 102 as cooling air. The cooling air taken into the housing 59 through the air intake units 102 cools coils 65, 70, and 71 (see FIG. 8) of the magnetic jacks of the control rod drive mechanism cooling device 101, while flowing downward in the housing 59. The cooling air whose temperature has risen by cooling the coils 65, 70, and 71 is suctioned in through the first inlet 109 and the second inlet 110, to which the suction force is applied by the exhaust fan 113 of the discharging unit 111. Accordingly, the cooling air is directly suctioned into the second exhaust duct 105 from the housing 59 through the first inlet 109, and is suctioned into the first exhaust ducts 104 from the housing 59 through the second inlet 110 via the second exhaust duct 105. The cooling air then flows up the first exhaust ducts 104, flows into the third exhaust duct 106, and is discharged to the exterior through the connected exhaust duct 112 by the exhaust fan 113.

In this case, the cooling air taken into the housing 59 through the air intake units 102 is suctioned in through the inlets 109 and 110 formed in almost the entire area of the lower portion of the housing 59 in the circumferential direction, and flows into the exhaust ducts 104 and 105. Accordingly, the cooling air flows from the center toward the outer peripheral side of the housing 59 in a proper manner, and is evenly circulated substantially throughout the inside of the housing 59. Consequently, the magnetic jacks are uniformly and efficiently cooled.

In this manner, in the cooling structure for the control rod drive mechanism of the first embodiment, the housing 59 in which the magnetic jacks are housed is fixed at the upper portion of the reactor vessel 41, and the air intake unit 102 that takes cooling air into the housing 59, the first exhaust ducts 104 that are arranged side by side with the air intake unit 102 in the circumferential direction of the housing 59, into which cooling air in the housing 59 is suctioned through the first inlet 109 at the lower portion of the first exhaust ducts 104, and that guide the cooling air upward, the second exhaust duct 105 that is disposed below the air intake unit 102, into which cooling air in the housing 59 is suctioned through the second inlet 110, and that guides the cooling air to the first exhaust ducts 104, and the discharging unit 111 that is formed at the upper portion of the housing 59 and discharges the cooling air in the first exhaust ducts 104 to the exterior are provided.

Accordingly, the cooling air taken into the housing 59 through the air intake unit 102 is suctioned in through the inlets 109 and 110 formed in almost the entire area of the lower portion of the housing 59 in the circumferential direction, and is discharged to the exterior through the exhaust ducts 104 and 105 via the discharging unit 111. Accordingly, the cooling air is evenly circulated substantially throughout the inside of the housing 59, thereby uniformly and efficiently cooling the magnetic jacks. It is thus possible to improve the cooling efficiency of the control rod drive mechanism 58.

In the cooling structure for the control rod drive mechanism of the first embodiment, the housing 59 includes the vertically disposed columns 114 arranged side by side at predetermined intervals in the circumferential direction, as structures. A flow passage of the second exhaust duct 105 is communicatively connected to the first exhaust ducts 104 by penetrating through the columns 114. Accordingly, the second exhaust duct 104 can be arranged without changing the columns 114. Consequently, it is possible to improve the cooling efficiency of the control rod drive mechanism 58, while preventing a reduction in the strength of the housing 59. In this case, the through hole 114a having a flow passage area smaller than the flow passage of the second exhaust duct 105 is formed on the column 114 located midway of the second exhaust duct 105. Consequently, it is possible to prevent a reduction in the strength of the column 114 as much as possible.

In the cooling structure for the control rod drive mechanism of the first embodiment, the openable and closable operation opening 103 is formed below the air intake unit 102 of the housing 59, and the second inlet 110 is formed below the operation opening 103. Accordingly, even if the operation opening 103 is formed in addition to the air intake unit 102, cooling air in the housing 59 is suctioned in through the inlets 109 and 110 formed in almost the entire area of the lower portion of the housing 59 in the circumferential direction, and is discharged to the exterior. Consequently, the cooling air is evenly circulated substantially throughout the inside of the housing 59.

In the cooling structure for the control rod drive mechanism of the first embodiment, the exhaust fan 113 is attached to the discharging unit 111. Accordingly, by operating the exhaust fan 113, negative pressure is applied to the inside of the housing 59 from the first exhaust ducts 104 and the second exhaust duct 105 through the inlets 109 and 110. Consequently, it is possible to forcibly discharge cooling air in the housing 59 to the exterior, and prevent stagnation of cooling air in the housing 59. As a result, it is possible to improve the cooling efficiency of the control rod drive mechanism 58.

In the cooling method for the control rod drive mechanism of the first embodiment, cooling air is taken into the housing 59 in which the magnetic jacks are housed along the upper side wall of the housing 59. The cooling air in the housing 59 is extracted to the exhaust ducts 103 and 104 along the entire periphery of the lower side wall of the housing 59 after cooling the magnetic jacks while directing the cooling air downward, and the cooling air is discharged to the exterior by the exhaust fan 113 after directing the cooling air upward through the exhaust ducts 103 and 104. Accordingly, the cooling air is evenly circulated substantially throughout the inside of the housing 59, thereby uniformly and efficiently cooling the magnetic jacks. It is thus possible to improve the cooling efficiency of the control rod drive mechanism.

The pressurized water reactor of the first embodiment includes the reactor vessel 41, the core barrel 46, the reactor core 53, the control rods 55, the control rod drive mechanism 58, and the control rod drive mechanism cooling device 101. In the control rod drive mechanism cooling device 101, the housing 59 in which the magnetic jacks are housed is fixed to the upper portion of the reactor vessel 41, and the air intake unit 102 that takes cooling air into the housing 59, the first exhaust ducts 104 that are arranged side by side with the air intake unit 102 in the circumferential direction of the housing 59, into which cooling air in the housing 59 is suctioned through the first inlet 109 at the lower portion of the first exhaust ducts 104, and that guide the cooling air upward, the second exhaust duct 105 that is disposed below the air intake unit 102, into which cooling air in the housing 59 is suctioned through the second inlet 110, and that guides the cooling air to the first exhaust ducts 104, and the discharging unit 111 that is formed at the upper portion of the housing 59 and discharges the cooling air in the first exhaust ducts 104 to the exterior are provided.

Accordingly, the cooling air taken into the housing 59 through the air intake unit 102 is suctioned in through the inlets 109 and 110 formed in almost the entire area of the lower portion of the housing 59 in the circumferential direction, and is discharged to the exterior through the exhaust ducts 104 and 105 via the discharging unit 111. Accordingly, the cooling air is evenly circulated substantially throughout the inside of the housing 59, thereby uniformly and efficiently cooling the magnetic jacks. It is thus possible to improve the cooling efficiency of the control rod drive mechanism 58, and as a result, it is possible to control the output of the nuclear reactor with a high level of accuracy.

Figure 9:
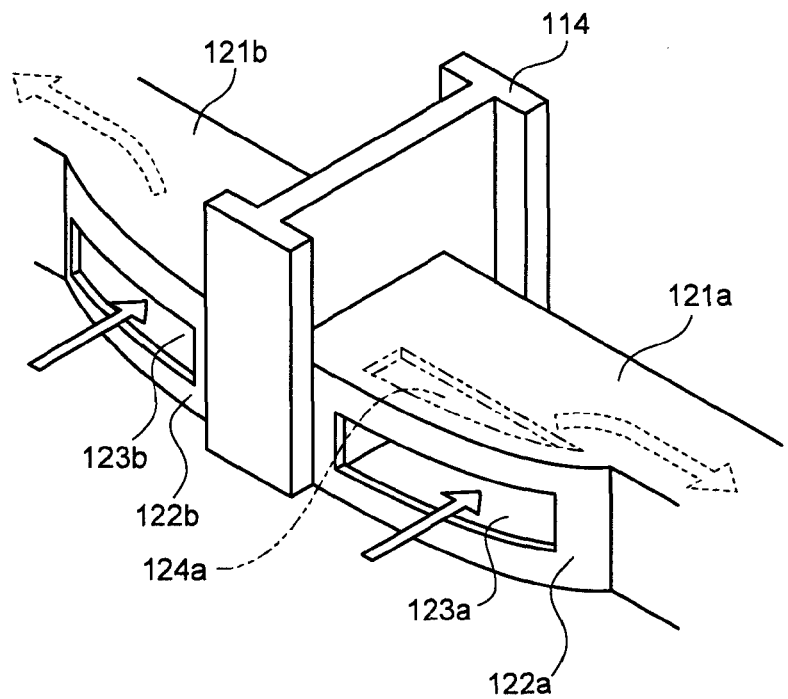
FIG. 9 is a schematic of second exhaust ducts in a control rod drive mechanism cooling device, illustrating a cooling structure for a control rod drive mechanism according to a second embodiment of the present invention.

FIG. 9 is a schematic of second exhaust ducts in a control rod drive mechanism cooling device, illustrating a cooling structure for a control rod drive mechanism according to a second embodiment of the present invention. The overall configuration in the cooling structure for the control rod drive mechanism of the present embodiment is approximately the same as that of the first embodiment described above, and is described with reference to FIGS. 1 to 4. The members having the same function as those described in the embodiment are denoted by the same reference numerals, and their repeated descriptions will be omitted.

In the cooling structure for the control rod drive mechanism of the second embodiment, only the shape of the second exhaust duct is different from that in the first embodiment. Accordingly, the overall structure of the control rod drive mechanism cooling device is described with reference to FIGS. 1 to 4, and the second exhaust duct is described in detail with reference to FIG. 9.

In the control rod drive mechanism cooling device of the second embodiment, as illustrated in FIGS. 1 to 4, the side wall of the housing 59 is formed by connecting the air intake unit 102, the operation opening 103, the first exhaust duct 104, second exhaust ducts 121a and 121b (see FIG. 9), and the third exhaust duct 106, and the upper portion of the housing 59 is connected to the ceiling 107. The magnetic jacks that form the control rod drive mechanism 58 are housed in the housing 59.

In other words, the air intake unit 102 and the operation opening 103 are vertically disposed so that the operation opening 103 is placed below the air intake unit 102. Two sets of the air intake units 102 and the operation openings 103 facing the radial direction of the housing 59 are provided at equal intervals in the circumferential direction. The first exhaust ducts 104 are arranged between the two sets of the air intake units 102 and the operation openings 103 in the circumferential direction of the housing 59. In other words, the air intake units 102, the operation openings 103, and the first exhaust ducts 104 are arranged side by side in the circumferential direction of the housing 59.

As illustrated in FIG. 9, in addition to FIGS. 1 to 4, the second exhaust ducts 121a and 121b are placed below the air intake unit 102 and the operation opening 103, and are disposed in the circumferential direction of the housing 59. Cooling air in the housing 59 is suctioned into the second exhaust ducts 121a and 121b, and is guided to the first exhaust ducts 104. The discharging unit 111 used to discharge the cooling air that has moved to the third exhaust duct 106 from the first exhaust ducts 104 to the exterior, is formed at the upper portion of the housing 59.

The housing 59 includes the vertically disposed columns 114 arranged side by side at equal intervals in the circumferential direction. The second exhaust ducts 121a and 121b are circumferentially disposed at both sides of one of the columns 114 placed at an intermediate position in the circumferential direction of the air intake unit 102. Projecting units 122a and 122b projecting inside the housing 59 are integrally formed at the base portions of the second exhaust ducts 121a and 121b. At the front surfaces of the projecting units 122a and 122b, second inlets 123a and 123b from which cooling air in the housing 59 is suctioned in and that guide the cooling air to the first exhaust ducts 104 are formed. In this case, a second inlet 124a may also be formed on the upper surface of the projecting unit 122a, in addition to the forming of the inlets on the front surfaces of the projecting units 122a and 122b. The leading edges of the second exhaust ducts 121a and 121b are extended to the first exhaust ducts 104 through the columns 114, and similar to the first embodiment, a through hole (not illustrated) is formed on each of the columns 114 located midway between the second exhaust ducts 121a and 121b.

In the control rod drive mechanism cooling device formed in this manner, if the exhaust fan 113 of the discharging unit 111 is operated, the suction force is applied to the inside of the housing 59 from the third exhaust duct 106 through the first inlet 109 of the first exhaust ducts 104. The suction force is also applied to the inside of the housing 59 from the third exhaust duct 106 through the second inlets 123a and 123b of the second exhaust ducts 121a and 121b via the first exhaust ducts 104. The suction force applied to the inside of the housing 59 is also applied to the two air intake units 102.

Accordingly, ambient air is taken into the housing 59 through the air intake units 102 as cooling air, and cools the magnetic jacks of the control rod drive mechanism cooling device 101, while flowing downward in the housing 59. The cooling air that has cooled the magnetic jacks is directly suctioned into the first exhaust ducts 104 from the housing 59 through the first inlet 109. The cooling air is also suctioned into the first exhaust ducts 104 from the inside of the housing 59 through the second inlets 123a and 123b via the second exhaust ducts 121a and 121b. The cooling air suctioned into the first exhaust ducts 104 flows up the interior, flows into the third exhaust duct 106, and is discharged to the exterior from the discharging unit 111.

In this case, the cooling air taken into the housing 59 through the air intake units 102 is suctioned in through the inlets 109, 123a, and 123b formed in almost the entire area of the lower portion of the housing 59 in the circumferential direction, and flows into the exhaust ducts 104, 121a, and 121b. Accordingly, the cooling air flows from the center toward the outer peripheral side of the housing 59 in a proper manner, and is evenly circulated substantially throughout the inside of the housing 59. Consequently, it is possible to uniformly and efficiently cool the magnetic jacks.

In this manner, the following are provided in the cooling structure for the control rod drive mechanism of the second embodiment: the air intake unit 102 through which cooling air is taken into the housing 59; the first exhaust ducts 104 that are arranged side by side with the air intake unit 102 in the circumferential direction of the housing 59, into which cooling air in the housing 59 is suctioned through the first inlet 109 at the lower portion of the first exhaust ducts 104, and that guide the cooling air upward; the second exhaust ducts 121a and 121b that are disposed below the air intake unit 102, into which cooling air in the housing 59 is suctioned through the second inlets 123a and 123b, and that guide the cooling air to the first exhaust ducts 104; and the discharging unit 111 that is formed at the upper portion of the housing 59 and discharges the cooling air in the first exhaust ducts 104 to the exterior.

Accordingly, the cooling air taken into the housing 59 through the air intake unit 102 is suctioned in through the inlets 109, 123a, and 123b formed in almost the entire area of the lower portion of the housing 59 in the circumferential direction, and is discharged to the exterior through the exhaust ducts 104, 121a, and 121b via the discharging unit 111. Consequently, the cooling air is evenly circulated substantially throughout the inside of the housing 59, thereby uniformly and efficiently cooling the magnetic jacks. It is thus possible to improve the cooling efficiency of the control rod drive mechanism 58.

In the cooling structure for the control rod drive mechanism of the second embodiment, the projecting units 122a and 122b projecting inside the housing 59 are formed at the base portions of the second exhaust ducts 121a and 121b, and the second inlets 123a and 123b are formed on the projecting units 122a and 122b. Accordingly, it is possible to improve the suction performance of cooling air from the housing 59 to the second exhaust ducts 121a and 121b by enlarging and obtaining sufficient opening areas of the second inlets 123a and 113b. Consequently, it is also possible to improve the cooling efficiency of the control rod drive mechanism 58 while preventing stagnation of cooling air in the housing 59.

Figure 10:
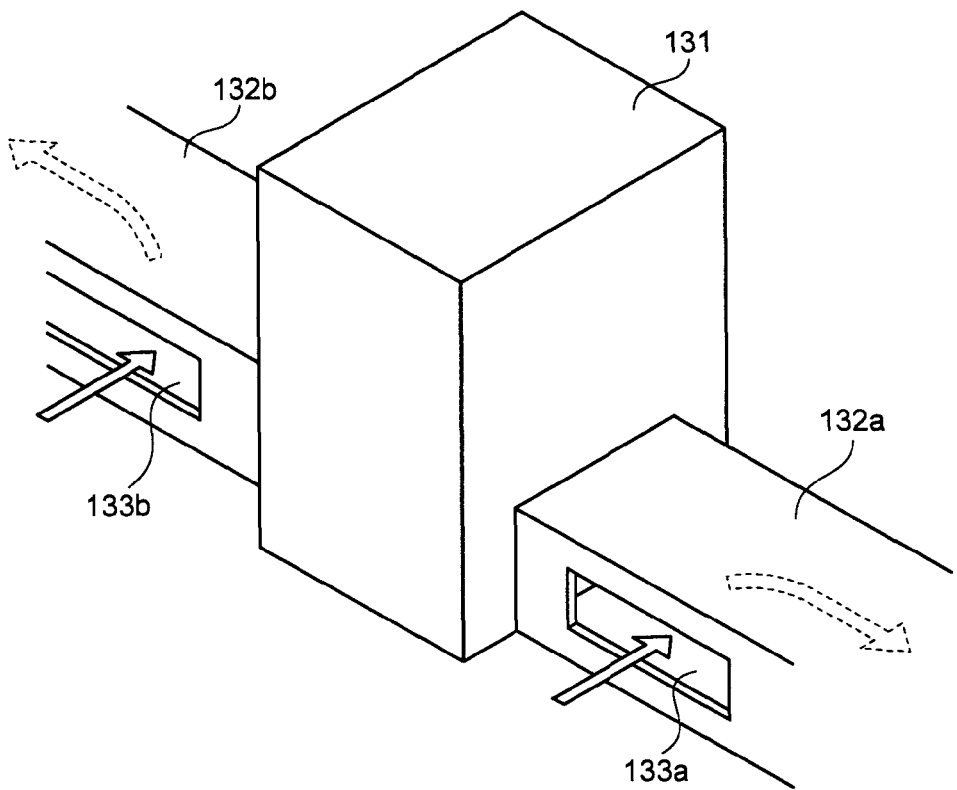
FIG. 10 is a schematic of second exhaust ducts in a control rod drive mechanism cooling device, illustrating a cooling structure for a control rod drive mechanism according to a third embodiment of the present invention.

FIG. 10 is a schematic of the second exhaust ducts in a control rod drive mechanism cooling device, illustrating a cooling structure for a control rod drive mechanism according to a third embodiment of the present invention. The overall configuration in the cooling structure for the control rod drive mechanism of the present embodiment is approximately the same as that of the first embodiment described above, and is described with reference to FIGS. 1 to 4. The members having the same function as those described in the embodiments are denoted by the same reference numerals, and their repeated descriptions will be omitted.

In the cooling structure for the control rod drive mechanism of the third embodiment, only the shape of columns (structures) is different from that in the first embodiment. Accordingly, the overall structure of the control rod drive mechanism cooling device is described with reference to FIGS. 1 to 4, and the columns and the second exhaust duct are described in detail with reference to FIG. 10.

In the control rod drive mechanism cooling device in the third embodiment, as illustrated in FIGS. 1 to 4, the side wall of the housing 59 is formed by connecting the air intake unit 102, the operation opening 103, the first exhaust duct 104, second exhaust ducts 132a and 132b (see FIG. 10), and the third exhaust duct 106, and the upper portion of the housing 59 is connected to the ceiling 107. The magnetic jacks that form the control rod drive mechanism 58 are housed in the housing 59.

In other words, the air intake unit 102 and the operation opening 103 are vertically arranged so that the operation opening 103 is placed below the air intake unit 102. Two sets of the air intake units 102 and the operation openings 103 facing the radial direction of the housing 59 are provided at equal intervals in the circumferential direction. The first exhaust ducts 104 are arranged between the two sets of the air intake units 102 and the operation openings 103 in the circumferential direction of the housing 59. In other words, the air intake units 102, the operation openings 103, and the first exhaust ducts 104 are arranged side by side in the circumferential direction of the housing 59.

As illustrated in FIG. 10, in addition to FIGS. 1 to 4, the second exhaust ducts 132a and 132b are placed below the air intake unit 102 and the operation opening 103, and are disposed in the circumferential direction of the housing 59. Cooling air in the housing 59 is suctioned into the second exhaust ducts 132a and 132b, and is guided to the first exhaust ducts 104. The discharging unit 111 used to discharge the cooling air that has moved to the third exhaust duct 106 from the first exhaust ducts 104 to the exterior, is formed at the upper portion of the housing 59.

The housing 59 includes a plurality of vertically disposed columns 131 arranged side by side at equal intervals in the circumferential direction. The columns 131 act as structures, and in the present embodiment, are made of hollow reinforced concrete. In other words, a predetermined strength is obtained because the air intake unit 102, the operation opening 103, the first exhaust duct 104, the second exhaust ducts 132*a* and 132*b*, the third exhaust duct 106, and the like are supported by the columns 131.

The second exhaust ducts 132*a* and 132*b* are circumferentially disposed at both sides of one of the columns 131 placed at an intermediate position in the circumferential direction of the air intake unit 102. Second inlets 133*a* and 133*b* opening inside the housing 59 are formed at the base portions of the second exhaust ducts 132*a* and 132*b*, and the leading edges are extended to the first exhaust ducts 104 through the columns 131. A through hole (not illustrated) is formed on each of the columns 131 located midway between the second exhaust ducts 132*a* and 132*b*.

In the control rod drive mechanism cooling device formed in this manner, if the exhaust fan 113 of the discharging unit 111 is operated, outer cooling air is taken into the housing 59 through the air intake units 102 by the suction force. The cooling air cools the magnetic jacks of the control rod mechanism cooling device 101, while flowing downward in the housing 59. The cooling air that has cooled the magnetic jacks is directly suctioned into the first exhaust ducts 104 from the housing 59 through the first inlet 109. The cooling air is also suctioned into the first exhaust ducts 104 from the housing 59 through the second inlets 133*a* and 133*b* via the second exhaust ducts 132*a* and 132*b*. The cooling air suctioned into the first exhaust ducts 104 flows up the interior, flows into the third exhaust duct 106, and is discharged to the exterior from the discharging unit 111.

In this case, the cooling air taken into the housing 59 through the air intake units 102 is suctioned in through the inlets 109, 133*a*, and 133*b* formed in almost the entire area of the lower portion of the housing 59 in the circumferential direction, and flows into the exhaust ducts 104, 132*a*, and 132*b*. In this manner, the cooling air flows from the center toward the outer peripheral side of the housing 59 in a proper manner, and is evenly circulated substantially throughout the inside of the housing 59, thereby uniformly and efficiently cooling the magnetic jacks.

In this manner, in the cooling structure for the control rod drive device of the third embodiment, the columns 131 made of hollow reinforced concrete are arranged side by side in the circumferential direction, as structures. The housing 59 is formed by supporting the air intake unit 102, the operation opening 103, the first exhaust ducts 104, the second exhaust ducts 132*a* and 132*b*, and the third exhaust duct 106, with the columns 131.

Accordingly, it is possible to obtain high rigidity of the housing 59 including the air intake unit 102, the operation opening 103, the first exhaust ducts 104, the second exhaust ducts 132*a* and 132*b*, and the third exhaust duct 106. It is also possible to efficiently dispose the exhaust ducts 104, 132*a*, 132*b*, and 106, and improve the cooling efficiency of the control rod drive mechanism 58.

Figure 11:
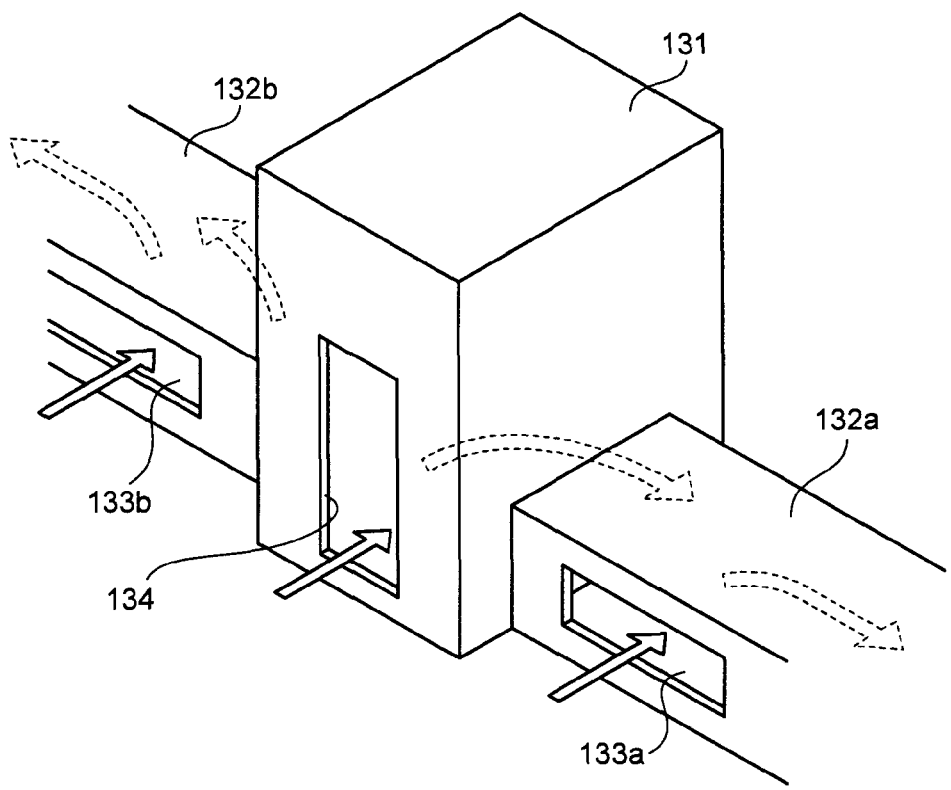
FIG. 11 is a schematic of second exhaust ducts in a control rod drive mechanism cooling device, illustrating a cooling structure for a control rod drive mechanism according to a fourth embodiment of the present invention.

FIG. 11 is a schematic of second exhaust ducts in a control rod drive mechanism cooling device, illustrating a cooling structure for a control rod drive mechanism according to a fourth embodiment of the present invention. The overall configuration in the cooling structure for the control rod drive mechanism of the present embodiment is approximately the same as that of the first embodiment described above, and is described with reference to FIGS. 1 to 4. The members having the same function as those described in the embodiments are denoted by the same reference numerals, and their repeated descriptions will be omitted.

In the cooling structure for the control rod drive mechanism of the fourth embodiment, only the shape of columns (structures) is different from that of the third embodiment. Accordingly, the overall structure of the control rod drive mechanism cooling device is described with reference to FIGS. 1 to 4, and the columns and the second exhaust duct are described in detail with reference to FIG. 11.

In the control rod drive mechanism cooling device of the fourth embodiment, as illustrated in FIGS. 1 to 4 and FIG. 11, the housing 59 includes the vertically disposed columns 131 arranged side by side at equal intervals in the circumferential direction. A predetermined strength is obtained because the air intake unit 102, the operation opening 103, the first exhaust duct 104, the second exhaust ducts 132*a* and 132*b*, the third exhaust duct 106, and the like are supported by the columns 131.

The second exhaust ducts 132*a* and 132*b* are circumferentially disposed at both sides of one of the columns 131 placed at an intermediate position in the circumferential direction of the air intake unit 102. A third inlet 134 opening inside the housing 59 is formed on the column 131 placed at the intermediate position. The base portions of the second exhaust ducts 132*a* and 132*b* are connected to the surface of the column 131, and are communicatively connected by a through hole. The second inlets 133*a* and 133*b* opening inside the housing 59 are formed at the base portions of the second exhaust ducts 132*a* and 132*b*, and the leading edges are extended to the first exhaust ducts 104 through the columns 131.

In the control rod drive mechanism cooling device formed in this manner, if the exhaust fan 113 of the discharging unit 111 is operated, outer cooling air is taken into the housing 59 through the air intake units 102 by the suction force, and the cooling air cools the magnetic jacks of the control rod drive mechanism cooling device 101, while flowing downward in the housing 59. The cooling air that has cooled the magnetic jacks is directly suctioned into the first exhaust ducts 104 from the housing 59 through the first inlet 109. The cooling air is also suctioned into the first exhaust ducts 104 from the housing 59 through the second inlets 133*a* and 133*b*, and the third inlet 134 via the second exhaust ducts 132*a* and 132*b*. The cooling air suctioned into the first exhaust ducts 104 flows up the interior, flows into the third exhaust duct 106, and is discharged to the exterior from the discharging unit 111.

In this case, the cooling air taken into the housing 59 through the air intake units 102 is suctioned in through the inlets 109, 133*a*, 133*b*, and 134 formed in almost the entire area of the lower portion of the housing 59 in the circumferential direction, and flows into the exhaust ducts 104, 132*a*, and 132*b*. Accordingly, the cooling air flows from the center toward the outer peripheral side of the housing 59 in a proper manner, and is evenly circulated substantially throughout the inside of the housing 59, thereby uniformly and efficiently cooling the magnetic jacks.

In this manner, the cooling structure for the control rod drive mechanism of the fourth embodiment includes the air intake unit 102 that takes cooling air into the housing 59, the first exhaust ducts 104 that are arranged side by side with the air intake unit 102 in the circumferential direction of the housing 59, into which cooling air in the housing 59 is suctioned through the first inlet 109 at the lower portion of the first exhaust ducts 104, and that guide the cooling air upward, the second exhaust ducts 131*a* and 131*b* that are disposed below the air intake unit 102, into which cooling air in the housing 59 is suctioned through the second inlets 132*a* and 132*b*, and that guide the cooling air to the first exhaust ducts 104, and the discharging unit 111 that is formed at the upper portion of the housing 59 and discharges the cooling air in the first exhaust ducts 104 to the exterior. The third inlet 134 communicatively connected to the second exhaust ducts 132*a* and 132*b* are also formed at a part of the columns 131 for supporting the housing 59.

Accordingly, the cooling air taken into the housing 59 through the air intake unit 102 is suctioned in through the inlets 109, 133*a*, 133*b*, and 134 formed in almost the entire area of the lower portion of the housing 59 in the circumferential direction, and is discharged to the exterior through the exhaust ducts 104, 132*a*, and 132*b* via the discharging unit 111. Consequently, the cooling air is evenly circulated substantially throughout the inside of the housing 59, thereby uniformly and efficiently cooling the magnetic jacks. It is thus possible to improve the cooling efficiency of the control rod drive mechanism 58. As a result, the second exhaust ducts 132*a* and 132*b* can be arranged without changing the columns 131, and by forming the third inlet 134, it is possible to prevent stagnation of cooling air in the housing 59 and prevent a reduction in the strength of the housing 59.

Figure 12:
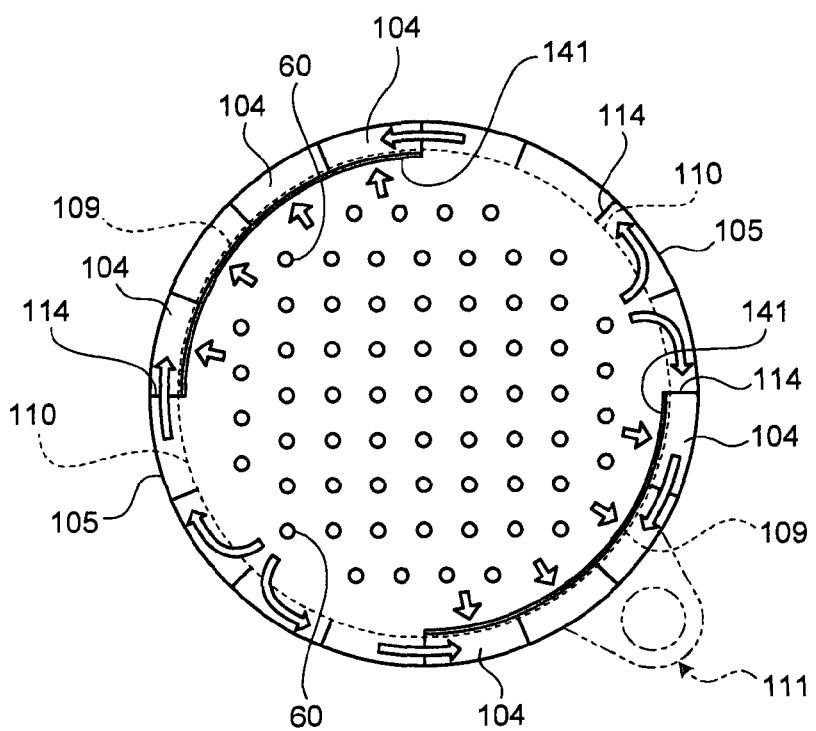
FIG. 12 is a horizontal sectional view of a control rod drive mechanism cooling device, illustrating a cooling structure for a control rod drive mechanism according to a fifth embodiment of the present invention.

FIG. 12 is a horizontal sectional view of a control rod drive mechanism cooling device, illustrating a cooling structure for a control rod drive mechanism according to a fifth embodiment of the present invention. The overall configuration in the cooling structure for the control rod drive mechanism of the present embodiment is approximately the same as that of the first embodiment described above, and is described with reference to FIGS. 1, 2, and 4. The members having the same function as those described in the embodiments are denoted by the same reference numerals, and their repeated descriptions will be omitted.

In the cooling structure for the control rod drive mechanism according to the fifth embodiment, only the structure of the first exhaust duct is different from that of the first embodiment. Accordingly, the overall structure of the control rod drive mechanism cooling device is described with reference to FIGS. 1, 2, and 4, and the first exhaust duct is described in detail with reference to FIG. 12.

In a control rod drive mechanism cooling device of the fifth embodiment, as illustrated in FIGS. 1, 2, and 4, the side wall of the housing 59 is formed by connecting the air intake unit 102, the operation opening 103, the first exhaust duct 104, the second exhaust duct 105, and the third exhaust duct 106, and the upper portion of the housing 59 is connected to the ceiling 107. The magnetic jacks that form the control rod drive mechanism 58 are housed in the housing 59.

In other words, the air intake unit 102 and the operation opening 103 are vertically disposed so that the operation opening 103 is placed below the air intake unit 102. Two sets of the air intake units 102 and the operation openings 103 facing the radial direction of the housing 59 are provided at equal intervals in the circumferential direction. The first exhaust ducts 104 are arranged between the two sets of the air intake units 102 and the operation openings 103, in the circumferential direction of the housing 59. In other words, the air intake units 102, the operation openings 103, and the first exhaust ducts 104 are arranged side by side in the circumferential direction of the housing 59. The second exhaust duct 105 is disposed below the air intake unit 102 and the operation opening 103, and is formed in the circumferential direction of the housing 59. Cooling air in the housing 59 is suctioned into the second exhaust duct 105 and is guided to the first exhaust ducts 104. The discharging unit 111 used to discharge cooling air that has moved to the third exhaust duct 106 from the first exhaust ducts 104 to the exterior, is formed at the upper portion of the housing 59.

In the present embodiment, a porous plate (flow rate adjusting member) 141 for adjusting an amount of cooling air flow is formed at a portion corresponding to the first inlet 109 of the first exhaust ducts 104. The porous plate 141 is made of a metal plate or a metal mesh through which a large number of openings are formed, and is fixed to the exterior (inside of the housing 59) where the first inlet 109 is formed in the first exhaust ducts 104. Accordingly, when the cooling air in the housing 59 is suctioned into the first exhaust ducts 104 through the first inlet 109, the flow rate of the cooling air is reduced because the porous plate 141 provides resistance.

In the control rod drive mechanism cooling device formed in this manner, if the exhaust fan 113 of the discharging unit 111 is operated, outer cooling air is taken into the housing 59 through the air intake units 102 by the suction force, and cools the magnetic jacks of the control rod drive mechanism cooling device 101, while flowing downward in the housing 59. The cooling air that has cooled the magnetic jacks is directly suctioned into the first exhaust ducts 104 from the housing 59 through the first inlet 109. The cooling air is also suctioned into the first exhaust ducts 104 from the housing 59 through the second inlet 109 via the second exhaust duct 105. The cooling air suctioned into the first exhaust ducts 104 flows up the interior, flows into the third exhaust duct 106, and is discharged to the exterior from the discharging unit 111.

In this case, the cooling air taken into the housing 59 through the air intake units 102 is suctioned in through the inlets 109 and 110 formed in almost the entire area of the lower portion of the housing 59 in the circumferential direction, and flows into the exhaust ducts 104 and 105. Accordingly, the cooling air flows from the center toward the outer peripheral side of the housing 59 in a proper manner, and is evenly circulated substantially throughout the inside of the housing 59, thereby uniformly and efficiently cooling the magnetic jacks. When the cooling air in the housing 59 is suctioned into the first exhaust ducts 104 through the first inlet 109, the flow rate of the cooling air is reduced by the porous plate 141. As a result, the cooling air in the housing 59 is easily suctioned into the second exhaust duct 105 through the second inlet 110, thereby allowing the cooling air in the housing 59 to circulate more evenly throughout the entire area.

In this manner, the cooling structure for the control rod drive mechanism of the fifth embodiment includes the air intake unit 102 that takes cooling air into the housing 59, the first exhaust ducts 104 that are arranged side by side with the air intake unit 102 in the circumferential direction of the housing 59, into which cooling air in the housing 59 is suctioned through the first inlet 109 at the lower portion of the first exhaust ducts 104, and that guide the cooling air upward, and the second exhaust duct 105 that is disposed below the air intake unit 102, into which cooling air in the housing 59 is suctioned through the second inlet 110, and that guides the cooling air to the first exhaust ducts 104. The porous plate 141 for adjusting the amount of cooling air flow is also formed at the first inlet 109 of the first exhaust ducts 104.

Accordingly, the cooling air taken into the housing 59 through the air intake unit 102 is suctioned in through the inlets 109 and 110 formed in almost the entire area of the lower portion of the housing 59 in the circumferential direction, and is discharged to the exterior through the exhaust ducts 104 and 105 via the discharging unit 111. At this time, because the passing flow rate at the first inlet 109 is limited by the porous plate 141, cooling air easily passes though the second inlet 110. Consequently, the amount of cooling air suctioned into the first exhaust ducts 104 through the first inlet 109 and the amount of cooling air suctioned into the second exhaust duct 105 through the second inlet 110 become approximately the same. As a result, the cooling air is evenly circulated substantially throughout the inside of the housing 59, thereby uniformly and efficiently cooling the magnetic jacks. It is thus possible to improve the cooling efficiency of the control rod drive mechanism 58.

Figure 13:
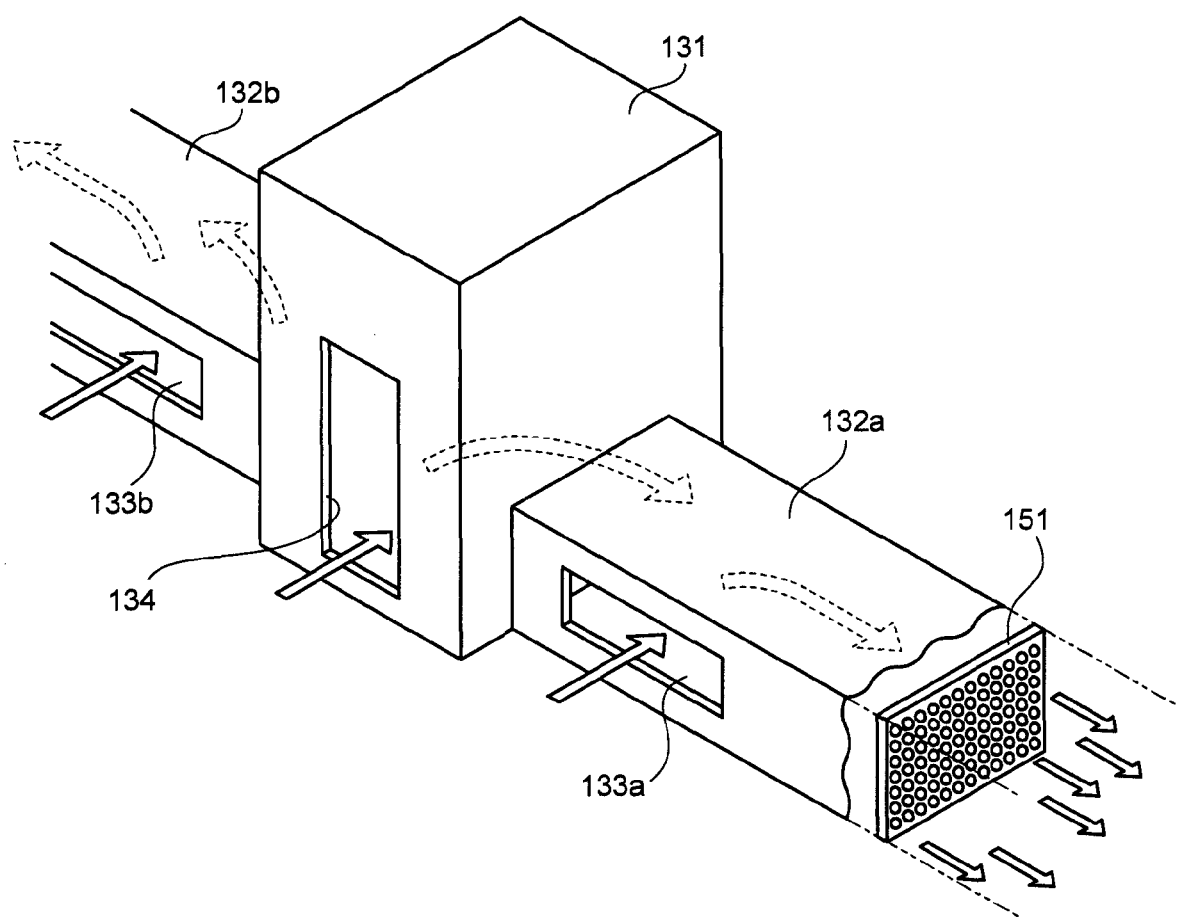
FIG. 13 is a schematic of second exhaust ducts in a control rod drive mechanism cooling device, illustrating a cooling structure for a control rod drive mechanism according to a sixth embodiment of the present invention.

FIG. 13 is a schematic of second exhaust ducts in a control rod drive mechanism cooling device, illustrating a cooling structure for a control rod drive mechanism according to a sixth embodiment of the present invention. The overall configuration in the cooling structure for the control rod drive mechanism of the present embodiment is approximately the same as that of the first embodiment described above, and is described with reference to FIGS. 1 to 4. The members having the same function as those described in the embodiments are denoted by the same reference numerals, and their repeated descriptions will be omitted.

In the cooling structure for the control rod drive mechanism of the sixth embodiment, only the structure of the second exhaust duct is different from that of the fourth embodiment. Accordingly, the overall structure of the control rod drive mechanism cooling device is described with reference to FIGS. 1 to 4, and the second exhaust duct is described in detail with reference to FIG. 13.

In the control rod drive mechanism cooling device of the sixth embodiment, as illustrated in FIGS. 1 to 4 and FIG. 13, the housing 59 includes the vertically disposed columns 131 arranged side by side at equal intervals in the circumferential direction. A predetermined strength is obtained because the air intake unit 102, the operation opening 103, the first exhaust duct 104, the second exhaust ducts 132a and 132b, the third exhaust duct 106, and the like are supported by the columns 131.

The second exhaust ducts 132a and 132b are circumferentially disposed at both sides of one of the columns 131 placed at an intermediate position in the circumferential direction of the air intake unit 102. The third inlet 134 opening inside the housing 59 is formed on the column 131 placed at the intermediate position. The base portions of the second exhaust ducts 132a and 132b are connected to the surface of the column 131, and are communicatively connected by a through hole. The second inlets 133a and 133b opening inside the housing 59 are formed on the base portions of the second exhaust ducts 132a and 132b, and the leading edges are extended to the first exhaust ducts 104 through the columns 131.

In the present embodiment, a porous plate (flow rate adjusting member) 151 for adjusting the amount of cooling air flow is formed at flow passages of the second exhaust ducts 132a and 132b. The porous plate 151 is made of a metal plate or a metal mesh through which a large number of openings are formed, and is fixed to the flow passages of cooling water in the second exhaust ducts 132a and 132b. Accordingly, if the cooling air in the housing 59 flows into the first exhaust ducts 104 through the second inlets 133a and 133b through the second exhaust ducts 132a and 132b, the flow rate of the cooling air is reduced because the porous plate 151 provides resistance.

In the control rod drive mechanism cooling device formed in this manner, if the exhaust fan 113 in the discharging unit 111 is operated, outer cooling air is taken into the housing 59 through the air intake units 102 by the suction force, thereby cooling the magnetic jacks of the control rod drive mechanism cooling device 101, while flowing downward in the housing 59. The cooling air that has cooled the magnetic jacks is directly suctioned into the first exhaust ducts 104 from the housing 59 through the first inlet 109. The cooling air is also suctioned into the first exhaust ducts 104 from the housing 59 through the second inlets 133a and 133b and the third inlet 134 via the second exhaust ducts 132a and 132b. The cooling air suctioned into the first exhaust ducts 104 flows up the interior, flows into the third exhaust duct 106, and is discharged to the exterior from the discharging unit 111.

In this case, the cooling air taken into the housing 59 through the air intake units 102 is suctioned in through the inlets 109, 133a, 133b, and 134 formed in almost the entire area of the lower portion of the housing 59 in the circumferential direction, and flows into the exhaust ducts 104, 132a, and 132b. Accordingly, the cooling air flows from the center toward the outer peripheral side of the housing 59 in a proper manner, and is evenly circulated substantially throughout the inside of the housing 59, thereby uniformly and efficiently cooling the magnetic jacks.

When the cooling air in the housing 59 is suctioned into the second exhaust ducts 132a and 132b through the second inlets 133a and 133b and the third inlet 134, the flow rate of the cooling air is reduced by the porous plate 151. Accordingly, the cooling air in the housing 59 is easily suctioned into the first exhaust ducts 104 through the first inlet 109, thereby allowing the cooling air in the housing to circulate more evenly throughout the entire area. In practice, because the second inlets 133a and 133b and the third inlet 134 are placed below the air intake unit 102, cooling air does not flow well through the second exhaust ducts 132a and 132b. However, if a large number of inlets 133a, 133b, and 134 are formed on the second exhaust ducts 132a, 132b, and the columns 131, cooling air sometimes does not flow well through the first exhaust ducts 104. In this case, the flow rate of the cooling air can be adjusted by forming the porous plate 151 in the second exhaust ducts 132a and 132b.

The porous plate 151 is formed in the air flow passages in the second exhaust ducts 132a and 132b. However, a porous plate may be formed in a part or all of the second inlets 133a and 133b, and the third inlet 134. In this case, the flow resistance value of the porous plate 151 may be changed, corresponding to the flow of cooling air in the housing 59.

In this manner, the cooling structure for the control rod drive mechanism of the sixth embodiment includes the air intake unit 102 that takes cooling air into the housing 59, the first exhaust ducts 104 that are arranged side by side with the air intake unit 102 in the circumferential direction of the housing 59, into which cooling air in the housing 59 is suctioned through the first inlet 109 at the lower portion of the first exhaust ducts 104, and that guide the cooling air upward, and the second exhaust ducts 132a and 132b that are arranged below the air intake unit 102, into which cooling air in the housing 59 is suctioned through the second inlets 133a and 133b, and that guide the cooling air to the first exhaust ducts 104. The porous plate 151 for adjusting the amount of cooling air flow is also formed in the second exhaust ducts 132a and 132b.

Accordingly, the cooling air taken into the housing 59 through the air intake unit 102 is suctioned in through the inlets 109, 133a, 133b, and 134 formed in almost the entire area of the lower portion of the housing 59 in the circumferential direction, and is discharged to the exterior through the exhaust ducts 104, 132a, and 132b via the discharging unit 111. At this time, because the passing flow rate of the second exhaust ducts 132a and 132b is limited by the porous plate 151, cooling air easily passes through the first inlet 109. Consequently, the amount of cooling air suctioned into the first exhaust ducts 104 through the first inlet 109 and the amount of cooling air suctioned into the second exhaust ducts 132a and 132b through the second inlets 133a and 133b become approximately the same. As a result, the cooling air is evenly circulated substantially throughout the inside of the housing 59, thereby uniformly and efficiently cooling the magnetic jacks. It is thus possible to improve the cooling efficiency of the control rod drive mechanism 58.

Each of the embodiments described above is applicable to a nuclear reactor that includes a reactor containment vessel and a coolant supply pipe system for supplying coolant to the reactor containment vessel, and that produces electricity by generating steam by heat exchange between nuclear fuel and coolant, driving power generating turbines with the generated steam. The embodiments are applicable not only to the pressurized water reactor (PWR) described above, but also to other types of reactor vessels, such as a boiling water reactor (BWR).

A cooling structure and a cooling method for a control rod drive mechanism and a nuclear reactor according to the present invention improve the cooling efficiency of the control rod drive mechanism by forming an inlet of an exhaust duct for discharging cooling air in a housing at an appropriate position. The cooling structure and the cooling method for the control rod drive mechanism and the nuclear reactor can be applied to any type of nuclear reactor.

The invention claimed is:

1. A cooling structure for a control rod drive mechanism that is placed at an upper portion of a reactor vessel and by which a control rod is inserted into and withdrawn from a reactor core, the cooling structure for the control rod drive mechanism comprising:
 a housing that is fixed to the upper portion of the reactor vessel;
 an air intake unit that takes cooling air into the housing;
 a first exhaust duct that is arranged side by side with the air intake unit in a circumferential direction of the housing, into which cooling air in the housing is suctioned through a first inlet at a lower portion thereof, and that guides the cooling air upward;
 a second exhaust duct that is disposed below the air intake unit, into which cooling air in the housing is suctioned through a second inlet, and that guides the cooling air to the first exhaust duct; and
 a discharging unit that is attached to an upper portion of the housing and discharges cooling air in the first exhaust duct to exterior.

2. The cooling structure for the control rod drive mechanism according to claim 1, wherein
 the housing includes a plurality of vertically disposed structures arranged side by side at predetermined intervals in a circumferential direction, and
 the second exhaust duct is communicatively connected to the first exhaust duct by penetrating through the structures.

3. The cooling structure for the control rod drive mechanism according to claim 2, wherein each of the structures is formed in a hollow shape, has a third inlet through which cooling air in the housing is suctioned, and is communicatively connected to the second exhaust duct through a thorough hole.

4. The cooling structure for the control rod drive mechanism according to claim 1, wherein the second exhaust duct includes a projecting unit projecting inside the housing and the second inlet is formed on the projecting unit.

5. The cooling structure for the control rod drive mechanism according to claim 1, wherein the first inlet is provided with a flow rate adjusting member for adjusting an amount of cooling air flow.

6. The cooling structure for the control rod drive mechanism according to claim 1, wherein the second exhaust duct includes a flow rate adjusting member for adjusting an amount of cooling air flow.

7. The cooling structure for the control rod drive mechanism according to claim 1, wherein the housing has an openable and closable operation opening formed below the air intake unit, and the second inlet is formed below the operation opening.

8. The cooling structure for the control rod drive mechanism according to claim 1, wherein the discharging unit includes an exhaust fan.

9. A cooling method for a control rod drive mechanism that is placed at an upper portion of a reactor vessel and by which a control rod is inserted into and withdrawn from a reactor core by using a magnetic jack, the cooling method comprising:
 taking cooling air into inside of a housing in which the magnetic jack is housed along an upper side wall of the housing;
 extracting cooling air in the housing to an exhaust duct along an entire periphery of a lower side wall of the housing after cooling the magnetic jack while directing the cooling air downward; and
 discharging the cooling air to exterior by an exhaust fan after directing the cooling air upward through the exhaust duct.

10. The cooling method for the control rod drive mechanism according to claim 9, wherein the exhaust duct is arranged side by side with an air intake unit in a circumferential direction of the housing, and cooling air that has cooled the magnetic jack is suctioned in through a first inlet at a lower portion of the exhaust duct, is suctioned in through a second inlet formed below the air intake unit, and is discharged by directing the cooling air upward through the exhaust duct.

11. A nuclear reactor comprising:
 a reactor vessel;
 a core barrel disposed in the reactor vessel;
 a reactor core disposed in the core barrel;
 a plurality of control rods that controls the reactor core;
 a control rod drive mechanism placed at an upper portion of the reactor vessel and by which the control rods are inserted into and withdrawn from the reactor core; and
 a control rod drive mechanism cooling device that cools the control rod drive mechanism with cooling air, wherein
 the nuclear reactor produces electricity by generating steam by heat exchange between nuclear fuel and coolant, and driving a power generating turbine with generated steam, and
 the control rod drive mechanism cooling device includes
  a housing that is fixed to the upper portion of the reactor vessel,
  an air intake unit that takes cooling air into the housing,
  a first exhaust duct that is arranged side by side with the air intake unit in a circumferential direction of the housing, into which cooling air in the housing is suctioned through a first inlet at a lower portion thereof, and that guides the cooling air upward,
  a second exhaust duct that is disposed below the air intake unit, into which cooling air in the housing is suctioned through a second inlet, and that guides the cooling air to the first exhaust duct, and
  a discharging unit that is provided to an upper portion of the housing and discharges cooling air in the first exhaust duct to exterior.

* * * * *